United States Patent
Sano

(10) Patent No.: US 9,367,747 B2
(45) Date of Patent: Jun. 14, 2016

(54) IMAGE PROCESSING APPARATUS, IMAGE PROCESSING METHOD, AND PROGRAM

(71) Applicant: Sony Corporation, Tokyo (JP)

(72) Inventor: Hironaga Sano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 141 days.

(21) Appl. No.: 14/255,464

(22) Filed: Apr. 17, 2014

(65) Prior Publication Data

US 2014/0348381 A1    Nov. 27, 2014

(30) Foreign Application Priority Data

May 24, 2013    (JP) ................................. 2013-110264

(51) Int. Cl.
*G06K 9/00* (2006.01)
*G06T 7/00* (2006.01)
*H04N 13/02* (2006.01)

(52) U.S. Cl.
CPC .......... *G06K 9/00771* (2013.01); *G06T 7/0042* (2013.01); *G06T 2207/30196* (2013.01); *G06T 2207/30232* (2013.01)

(58) Field of Classification Search
USPC ......... 382/100, 103, 106–107, 118, 154, 162, 382/165, 168, 173, 181, 193–199, 209, 219, 382/232, 254, 274, 276, 285–291, 305, 382/312; 345/156, 419; 348/46
See application file for complete search history.

(56) References Cited

U.S. PATENT DOCUMENTS

| | | | |
|---|---|---|---|
| 6,856,314 B2* | 2/2005 | Ng | G06K 9/20 345/419 |
| 2011/0080336 A1* | 4/2011 | Leyvand | A63F 13/06 345/156 |
| 2012/0106791 A1* | 5/2012 | Lim | G06K 9/00771 382/103 |
| 2012/0229607 A1* | 9/2012 | Baker | H04N 13/0221 348/46 |
| 2013/0182904 A1* | 7/2013 | Zhang | H04N 7/18 382/103 |

FOREIGN PATENT DOCUMENTS

JP    2008-131405 A    6/2008

* cited by examiner

*Primary Examiner* — Seyed Azarian
(74) *Attorney, Agent, or Firm* — Michael Best & Friedrich LLP

(57) ABSTRACT

An image processing apparatus includes a detection unit which detects an object which is included in an image; and a determination unit which determines a positional relationship between a detected object and a protective barrier region in a depth direction of the image based on a feature amount relating to at least one of the detected object and the protective barrier region, when the detected object and the protective barrier region overlap with each other in the image.

20 Claims, 15 Drawing Sheets

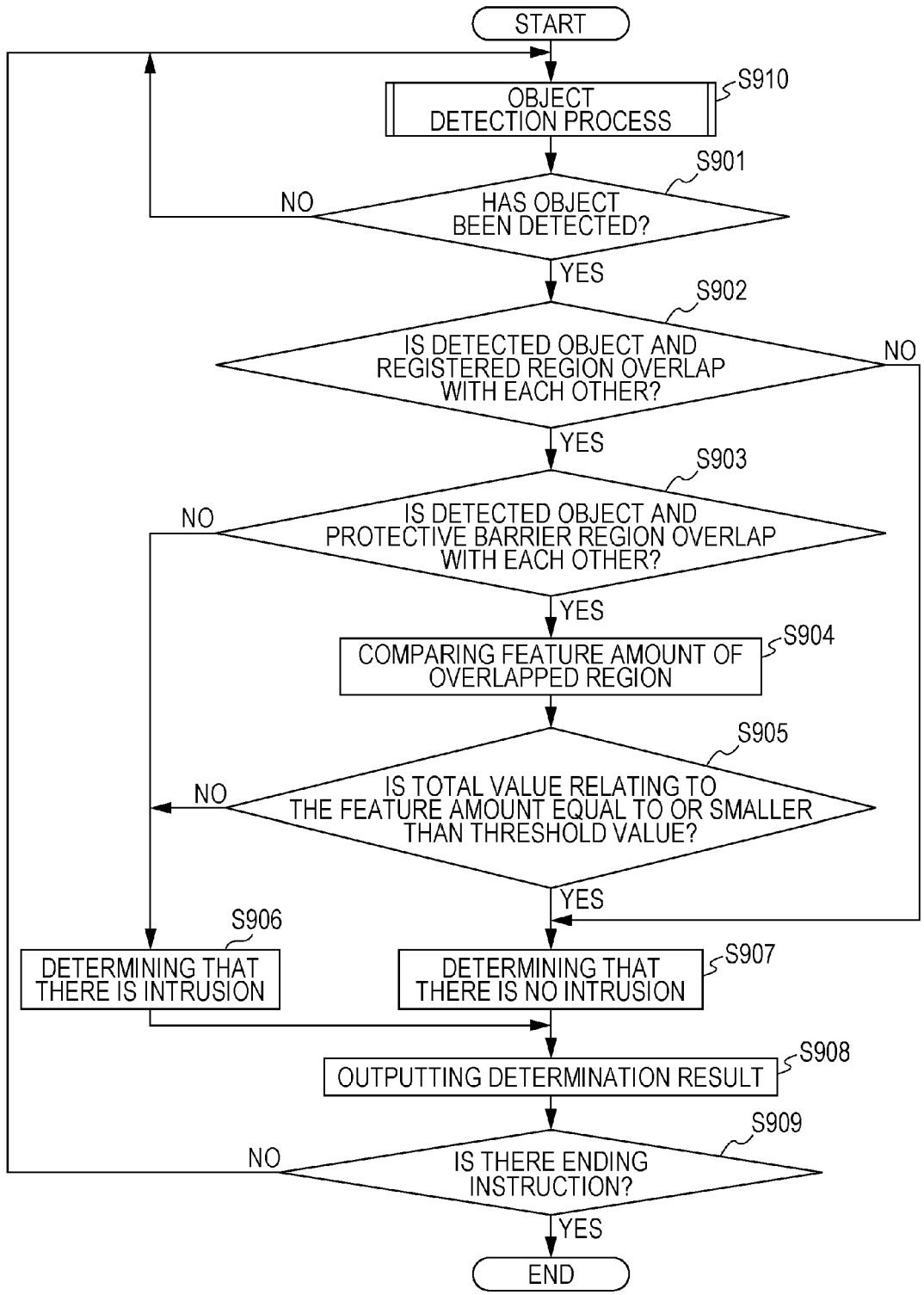

IMAGE PROCESSING APPARATUS, IMAGE PROCESSING METHOD, AND PROGRAM

CROSS REFERENCE TO RELATED APPLICATIONS

This application claims the benefit of Japanese Priority Patent Application JP 2013-110264 filed May 24, 2013, the entire contents of which are incorporated herein by reference.

BACKGROUND

The present technology relates to an image processing apparatus. Specifically, the present technology relates to an image processing apparatus which handles an image, an image processing method, and a program which causes a computer to execute the method.

In the related art, an image processing apparatus such as an imaging apparatus which images a photographic subject such as a person, and generates an image (image data) has become widespread. In addition, a technology of recognizing a photographic subject which detects an object such as a person, or a moving object included in an image generated in this manner has been proposed.

An image processing apparatus which detects a face of a person which is included in an image, using an image processing in which a feature amount such as luminance or a color, for example, is used has been proposed (for example, refer to Japanese Unexamined Patent Application Publication No. 2008-131405).

SUMMARY

According to the above described related art, it is possible to detect an object such as a person, or a moving object which is included in an image.

Here, a case in which an object as a detection target, and another object are present in a range to be imaged of an apparatus for imaging a photographic subject (for example, imaging apparatus), for example, is assumed. For example, a case in which a fence (another object) which is provided at a boundary of a circumferential intrusion prohibition region, and a person (an object as a detection target) who is present in the vicinity of the intrusion prohibition region are present is assumed. In this case, for example, it is possible to detect the person who is present in the vicinity of the intrusion prohibition region, however, it is assumed that it is not easy to accurately determine whether or not a person has intruded into the intrusion prohibition region. Therefore, when it is possible to determine a positional relationship between the fence and a person in the depth direction of an image, for example, it is considered that whether or not a person has intruded into the intrusion prohibition region can be accurately determined.

It is desirable to enhance detection precision of an object.

According to an embodiment of the present technology, there are provided an image processing apparatus which includes a detection unit which detects an object which is included in an image; and a determination unit which determines a positional relationship between a detected object and a protective barrier region in a depth direction of the image based on a feature amount relating to at least one of the detected object and the protective barrier region when the detected object and the protective barrier region overlap with each other in the image, and an image processing method thereof, and a program which causes the method to be executed by a computer. In this manner, when a detected image and a protective barrier region overlap with each other in an image, it is possible to determine a positional relationship between the detected image and the protective barrier region in the depth direction of the image based on the feature amount relating to at least one of the detected object and the protective barrier region.

In the image processing apparatus, the determination unit may compare a feature amount which is included in an overlapped region of the detected object in the image, and a feature amount which is included in the overlapped region in the protective barrier region which is stored in a storage unit with each other, with respect to the overlapped region of the detected object and the protective barrier region in the image, and may determine the positional relationship based on the comparison result. In this manner, it is possible to compare a feature amount which is included in an overlapped region of the detected object, and a feature amount included in an overlapped region in the protective barrier region which is stored in the storage unit with each other, with respect to an overlapped region of the detected object and the protective barrier region in an image, and to determine a positional relationship thereof based on the comparison result.

In the image processing apparatus, the determination unit may compare a pixel which is included in the overlapped region of the detected object, and a pixel which is included in the overlapped region in the protective barrier region with each other, and may determine the positional relationship based on a degree of similarity of the pixels in the overlapped region. In this manner, it is possible to compare a pixel which is included in an overlapped region of a detected object to a pixel which is included in an overlapped region in a protective barrier region, and to determine a positional relationship thereof based on a degree of similarity of the pixels in the overlapped region.

In the image processing apparatus, the protective barrier region may be a region of a protective barrier which is an object provided at a boundary of a registered region which is registered in the image, or in a vicinity of the boundary, and blocks the detected object, and the determination unit may determine a positional relationship when the detected object and the registered region overlap with each other in the image, and the detected object and the protective barrier region overlap with each other in the image, and may determine whether or not the detected object has intruded into the registered region based on the determination result. In this manner, when a detected object and a registered region in an image overlap with each other, and the detected object and a protective barrier region overlap with each other in the image, it is possible to determine whether or not the detected object has intruded into the registered region based on the determination result, by determining a positional relationship thereof.

In the image processing apparatus, the detection unit may detect a moving object which is included in the image, and the determination unit may determine whether or not there is occlusion relating to the detected moving object. In this manner, it is possible to determine whether or not there is occlusion relating to a detected moving object.

In the image processing apparatus, the determination unit may determine whether or not there is occlusion based on a comparison result which is produced by comparing size information relating to the detected moving object to size information relating to a moving object which is detected immediately before the moving object in the image. In this manner, it is possible to determine whether or not there is occlusion based on a comparison result, by comparing size information relating to a detected moving object to size information relating to a moving object which is detected immediately before the moving object in an image.

In the image processing apparatus, the determination unit may determine a plurality of moving objects which are close to both sides of the protective barrier region to be one moving object, when it is determined that there is occlusion. In this manner, when it is determined that there is occlusion, it is possible to determine a plurality of moving objects which are close to both sides of a protective barrier region to be one moving object.

According to the present technology, it is possible to obtain an excellent effect of enhancing detection precision of an object.

BRIEF DESCRIPTION OF THE DRAWINGS

FIG. 7 is a flowchart which illustrates an example of a processing procedure of an intrusion determination process of an object by the image processing apparatus according to the embodiment of the present technology.

DETAILED DESCRIPTION OF EMBODIMENTS

Hereinafter, embodiments for executing the present technology will be described. Descriptions will be made in the following order.

1. First Embodiment (Example in which intrusion determination process of object is performed using protective barrier region information)
2. Second Embodiment (Example in which occlusion determination process is performed using protective barrier region information)
3. Third Embodiment (Example of image processing system configured of a plurality of apparatuses)
4. Modification Example

1. First Embodiment

Configuration Example of Image Processing Apparatus

Figure 1:
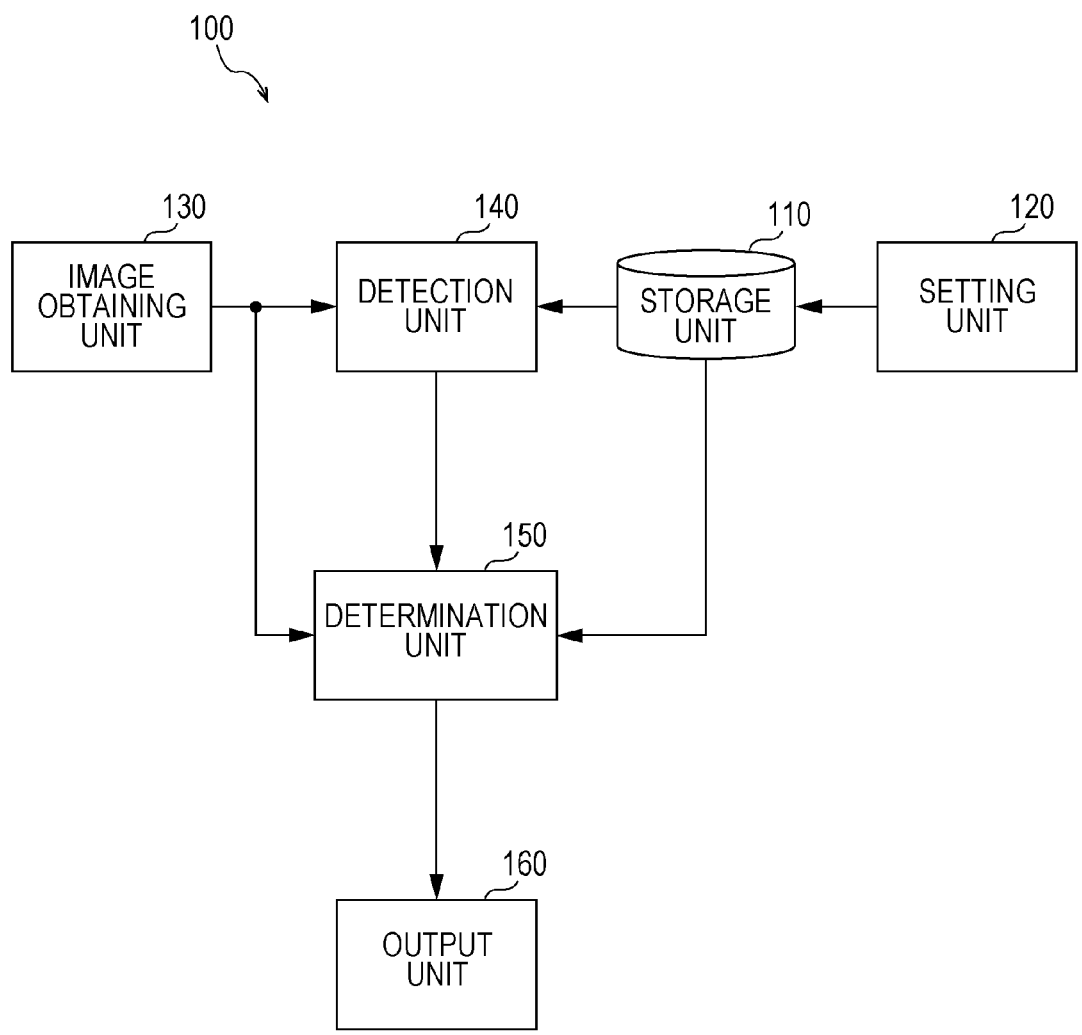
FIG. 1 is a block diagram which illustrates a functional configuration example of an image processing apparatus according to an embodiment of the present technology.

FIG. 1 is a block diagram which illustrates a functional configuration example of an image processing apparatus 100 according to a first embodiment of the present technology.

The image processing apparatus 100 includes a storage unit 110, a setting unit 120, an image obtaining unit 130, a detection unit 140, a determination unit 150, and an output unit 160. The image processing apparatus 100 is executed by, for example, an imaging apparatus (for example, surveillance camera) for monitoring an intruder in a registered region (for example, intrusion prohibition region), or an object detection device. In addition, according to the first embodiment of the present technology, an image processing apparatus in which an imaging range which is a monitoring target (for example, image processing apparatus which fixes imaging unit which images imaging range as monitoring target) is fixed will be described as an example.

The storage unit 110 stores information relating to a background image (background image information), information relating to a registered region (registered region information), and information relating to a protective barrier region (protective barrier region information). In addition, the storage unit 110 supplies the stored background image information to the detection unit 140, and the stored registered region information and the protective barrier region information to the determination unit 150.

Figure 2A:
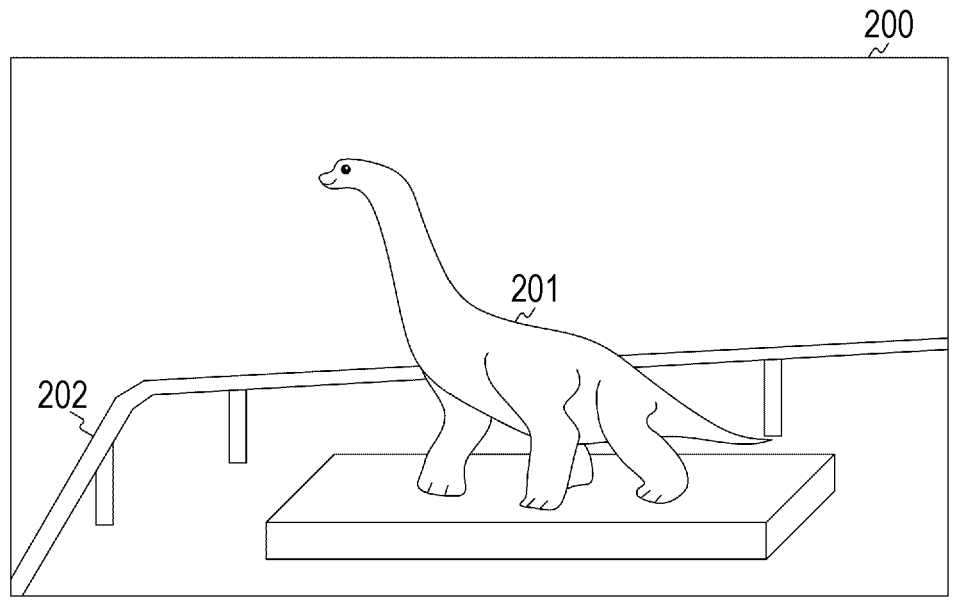
FIGS. 2A and 2B are diagrams which illustrate examples of a background image, a registered region, and a protective barrier region which are used in each process by the image processing apparatus according to the embodiment of the present technology.

Here, the background image is an image corresponding to the imaging range which is the monitoring target, and means an image in which an intruding object (for example, intruder) is not present. The background image is, for example, a background image 200 which is illustrated in FIG. 2A. In addition, the background image will be described in detail with reference to FIG. 2A.

Figure 2B:
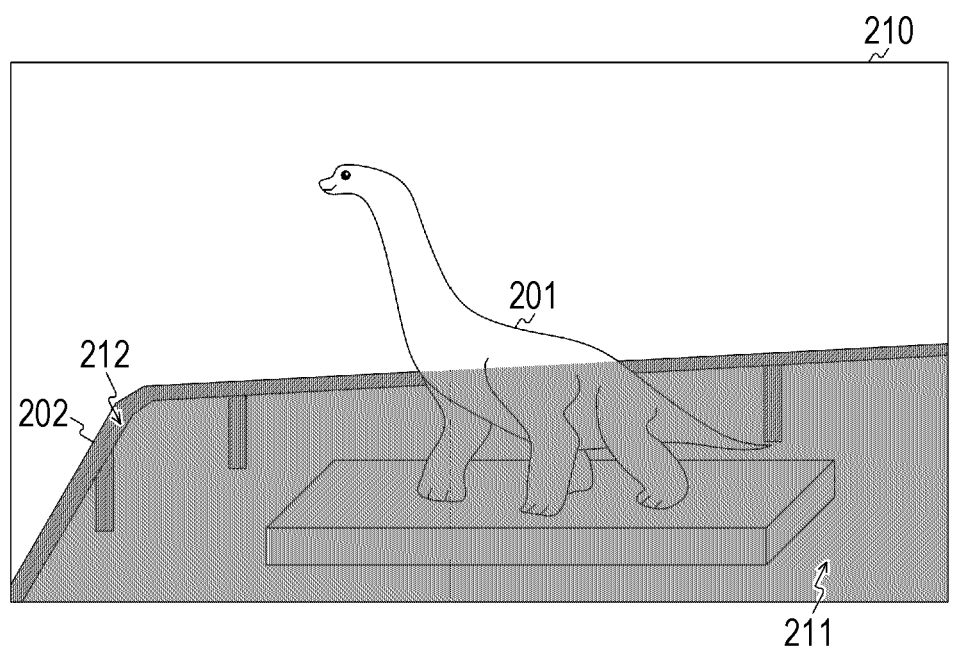

In addition, the registered region is a region which is set by the setting unit 120 (registered region (for example, intrusion prohibition region)). The registered region is, for example, a registered region 211 which is illustrated in FIG. 2B. In addition, the registered region will be described in detail with reference to FIG. 2B. In addition, the registered region information will be described in detail with reference to FIGS. 4A and 4B.

In addition, the protective barrier region is a region corresponding to an object (protective barrier) which may be shielded by an intruding object (protective barrier region) in the registered region, or the vicinity of the registered region. The protective barrier is a fence which is provided at a boundary of the intrusion prohibition region, or in the vicinity of the boundary (for example, fence 202 which is illustrated in FIG. 2A). In addition, the protective barrier region is, for example, a protective barrier region 212 which is illustrated in FIG. 2B. In addition, the protective barrier region is set by the setting unit 120. In addition, the protective barrier region will be described in detail with reference to FIG. 2B. In addition, the protective barrier region information will be described in detail with reference to FIGS. 5A and 5B.

The setting unit 120 sets the registered region and the protective barrier region, respectively. For example, the setting unit 120 can set a region which is designated by a manual operation by a user in the background image as the registered region. In addition, for example, the setting unit 120 can set a region which is designated using a manual operation by a user in the set registered region, or in the vicinity of the registered region as the protective barrier region. In addition, registered region information relating to the set registered region, and protective barrier region information relating to the set protective barrier region are respectively stored in the storage unit 110 by being related to each other.

An image obtaining unit 130 obtains an image (image data) which is used in each process (object detection process, intrusion determination process of object), and outputs the obtained image to the detection unit 140 and the determination unit 150. For example, the image obtaining unit 130 is executed by an imaging unit which generates an image by imaging a photographic subject. The imaging unit is configured of, for example, an optical system (a plurality of lenses), an imaging element, and a signal processing unit. In addition, for example, the image obtaining unit 130 may obtain an image which is generated by another imaging apparatus. In addition, according to the embodiment of the present technology, when describing with an "image", it means both the image itself, and image data for displaying the image.

The detection unit 140 detects an object which is included in an image which is output from the image obtaining unit 130, based on the background image information which is stored in the storage unit 110. In addition, the detection unit 140 outputs object detection information (detection result) relating to the detected object to the determination unit 150. For example, the detection unit 140 can detect an object using a background difference method. Here, the background difference method is an object detection method in which a background image which is stored in advance (standard pattern) and an input image are compared to each other, and it is determined that there are some changes in a portion having difference in density, based on the comparison result. In addition, an object may be detected using another object detection method such as an inter-frame difference method. Here, the inter-frame difference method is a moving object detection method in which a difference between a current input image and the previous input image is calculated, and a region with a large difference value is detected as a moving object.

The determination unit 150 determines whether or not an object which is detected by the detection unit 140 has intruded into the registered region (for example, intrusion prohibition region), and outputs a determination result thereof to an output unit 160. For example, the determination unit 150 determines whether or not an object which is detected by the detection unit 140 has intruded into the registered region (for example, intrusion prohibition region), based on the registered region information and the protective barrier region information which are stored in the storage unit 110, and the object detection information which is output from the detection unit 140.

For example, when the object detected and the protective barrier region in the image which is output from the image obtaining unit 130 overlap with each other, the determination unit 150 determines a positional relationship between the detected object and the protective barrier region in the depth direction of the image. For example, the determination unit 150 determines the positional relationship based on a feature amount relating to at least one of the detected object and the protective barrier region. In this case, the determination unit 150 compares a feature amount which is included in an overlapped region of the detected object and a feature amount which is included in an overlapped region in the protective barrier region information which is stored in the storage unit 110 to each other, with respect to the overlapped region of the detected object and the protective barrier region. In addition, the determination unit 150 determines a positional relationship thereof based on the comparison result. For example, the determination unit 150 compares pixels which are included in the overlapped region of the detected object and pixels which are included in the overlapped region in the protective barrier region to each other, and determines a positional relationship thereof based on a degree of similarity of pixels in the overlapped region.

In addition, for example, when an object which is detected in an image and a registered region are overlapped with each other, and the detected object and a protective barrier region are overlapped with each other, the determination unit 150 determines a positional relationship thereof is determined, and determines whether or not the detected object has intruded into the registered region based on a determination result thereof.

For example, execution of the detection unit 140 and the determination unit 150 is performed by a signal processing unit which performs a predetermined signal process with respect to an image.

The output unit 160 outputs a determination result which is output from the determination unit 150. The output unit 160 is executed by a display unit which displays each image, or a sound output unit which outputs each sound information. In addition, only when determining that an object which is detected by the detection unit 140 has intruded into a registered region (for example, intrusion prohibition region), the output unit 160 may output a determination result thereof as an intrusion warning.

In addition, the detection unit 140 and the determination unit 150 may perform a detection process and a determination process with respect to all of images (whole frame) which are output from the image obtaining unit 130, and may perform the detection process and the determination process at each of predetermined intervals (for example, after each minute).

Examples of Background Image, Registered Region, and Protective Barrier Region

FIGS. 2A and 2B are diagrams which illustrate an example of a background image, a registered region, and a protective barrier region which are used in each process by the image processing apparatus 100 according to the first embodiment of the present technology.

FIG. 2A illustrates a background image 200. As described above, the background image 200 is an image corresponding to an imaging range which becomes a monitoring target of the image processing apparatus 100, and an image in which an intruding object (for example, intruder) is not present. In FIG. 2A, an example in which a reconstructed model of a dinosaur 201 and a periphery thereof are set to monitoring targets using the image processing apparatus 100 is illustrated. In addition, in the imaging range as the monitoring target the reconstructed model of the dinosaur 201 and the periphery (inside of fence 202) are set to intrusion prohibition regions, and the fence 202 is provided so that a person except for staff does not intrude into the intrusion prohibition region.

FIG. 2B illustrates a registered region 211 and a protective barrier region 212. In addition, in FIG. 2B, the registered region 211 and the protective barrier region 212 are illustrated on the background image 210. In addition, in FIG. 2B, the registered region 211 is colored, and the protective barrier region 212 is denoted using slanted lines.

In addition, in FIG. 2B, an example is illustrated in which the protective barrier region 212 is included in the registered region 211, however, the registered region and the protective barrier region may be set to different regions.

Example of Relationship Between Registered Region and Object

Figure 3A:
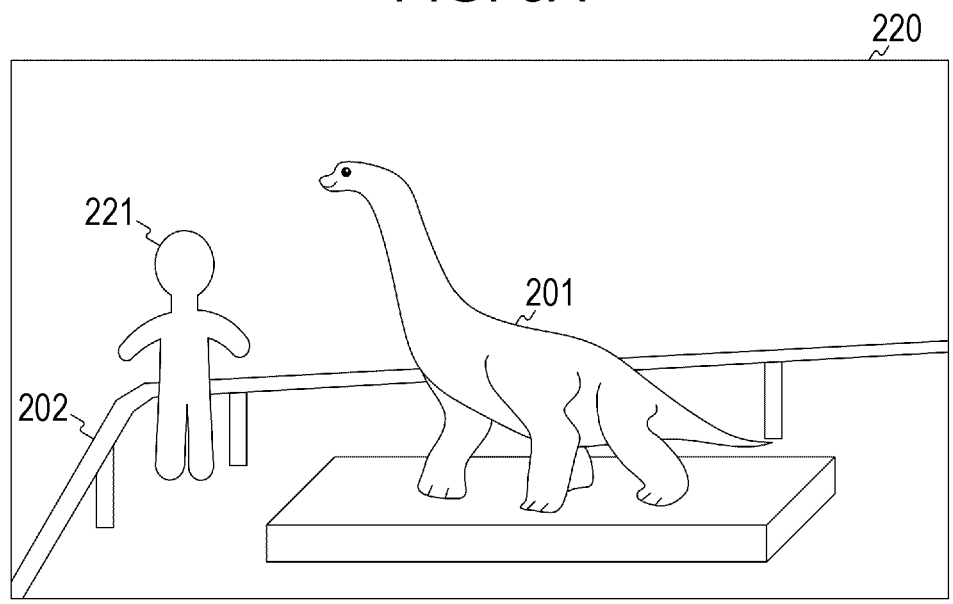
FIGS. 3A and 3B are diagrams which illustrate an example of a relationship between a registered region and an object in an image which is obtained by an image obtaining unit according to the embodiment of the present technology.
Figure 3B:
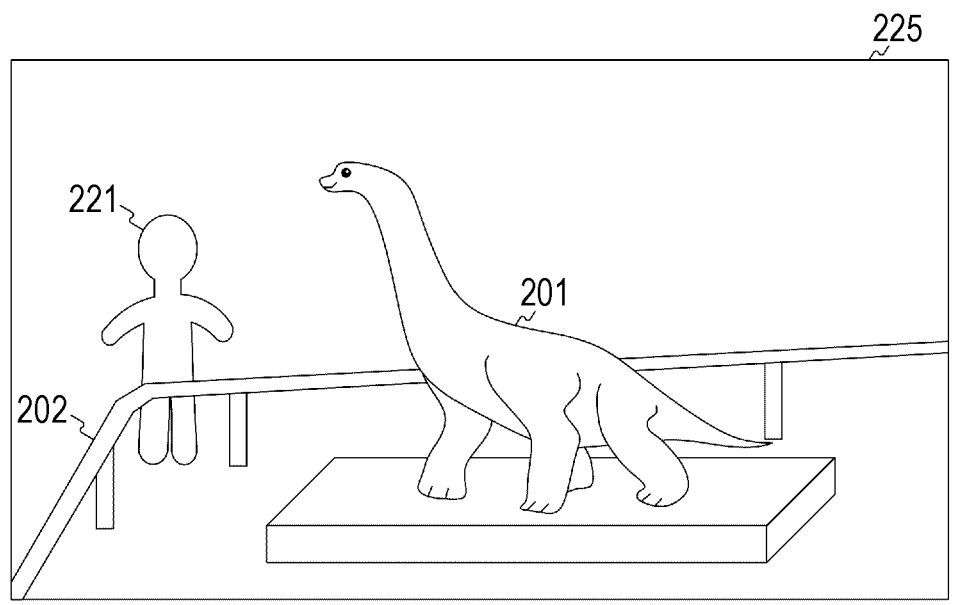

FIGS. 3A and 3B are diagrams which illustrate examples of a relationship between the registered region and an object in an image which is obtained by the image obtaining unit 130 according to the first embodiment of the present technology.

FIG. 3A illustrates an image 220 when a person 221 has intruded into the intrusion prohibition region (when person 221 is present inside fence 202). In this manner, when the person 221 has intruded into the intrusion prohibition region (when person 221 is present inside fence 202), the person 221 and the registered region 211 (illustrated in FIG. 2B) overlap with each other in the image 220. For this reason, it is possible to determine the intrusion of the person 221 into the intrusion prohibition region based on whether or not the person 221 and the registered region 211 overlap with each other.

FIG. 3B illustrates an image 225 in a case in which the person 221 is present out of the intrusion prohibition region (case in which person 221 is present outside fence 202). In this manner, even when the person 221 is present out of the intrusion prohibition region (case in which person 221 is present outside fence 202), there is a case in which the person 221 and the registered region 211 overlap with each other (illustrated in FIG. 2B) in the image 225. For example, a case in which feet of the person 221 and the registered region 211 overlap with each other is assumed. For this reason, there is a concern that an erroneous determination that the person 221 has intruded into the intrusion prohibition region may be made based on whether or not the person 221 and the registered region 211 overlap with each other.

Therefore, according to the first embodiment of the present technology, the intrusion determination process of an object is performed using the protective barrier region information. In this manner, it is possible to enhance detection precision of an object by avoiding an erroneous determination with respect to an intrusion into the intrusion prohibition region.

Figure 4A:
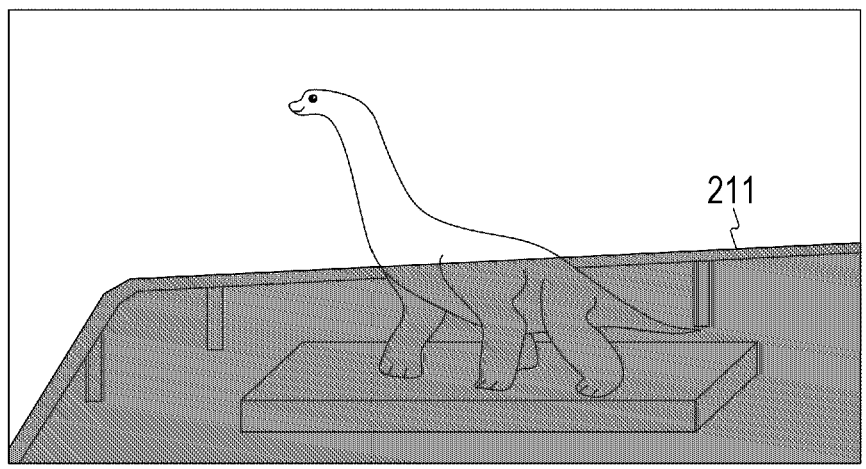
FIGS. 4A and 4B are diagrams which illustrate an example of a relationship between registered region information and the registered region which is stored in a storage unit according to the embodiment of the present technology.
Figure 4B:
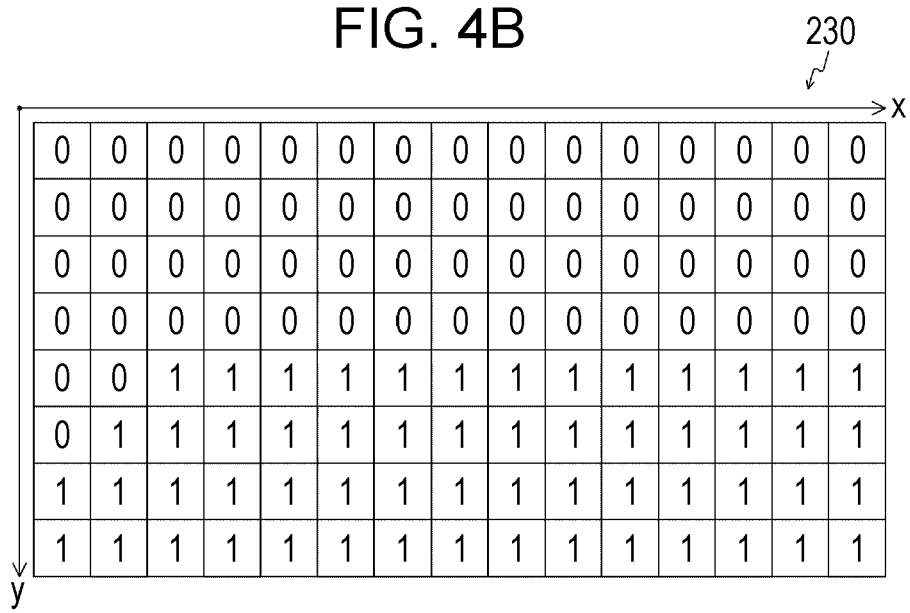

Example of Relationship Between Registered Region and Registered Region Information FIGS. 4A and 4B are diagrams which illustrate examples of a relationship between registered region information which is stored in the storage unit 110 and a registered region according to the first embodiment of the present technology.

FIG. 4A illustrates the registered region 211 on the background image. In addition, the registered region 211 is the same as that in FIG. 2B.

FIG. 4B illustrates registered region information 230 corresponding to the registered region 211 which is illustrated in FIG. 4A. Here, the registered region information 230 is information for specifying the registered region 211. In addition, FIG. 4B exemplifies the registered region information 230 in which the registered region 211 is specified using a feature amount (for example, 1). In addition, in FIG. 4B, for ease of description, coordinates corresponding to a background image (for example, XY coordinates in which upper left in FIG. 4B is set to an origin) are schematically illustrated using 120 rectangles (8×15). In addition, in each rectangle, "1" denotes the registered region 211, and regions except for the registered region 211 are illustrated by having "0" attached.

Figure 5A:
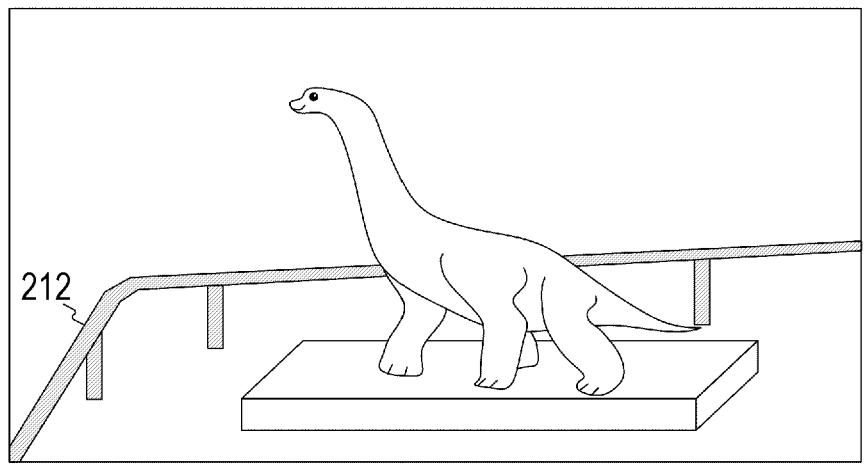
FIGS. 5A and 5B are diagrams which illustrate an example of a relationship between protective barrier region information and the protective barrier region which is stored in a storage unit according to the embodiment of the present technology.
Figure 5B:
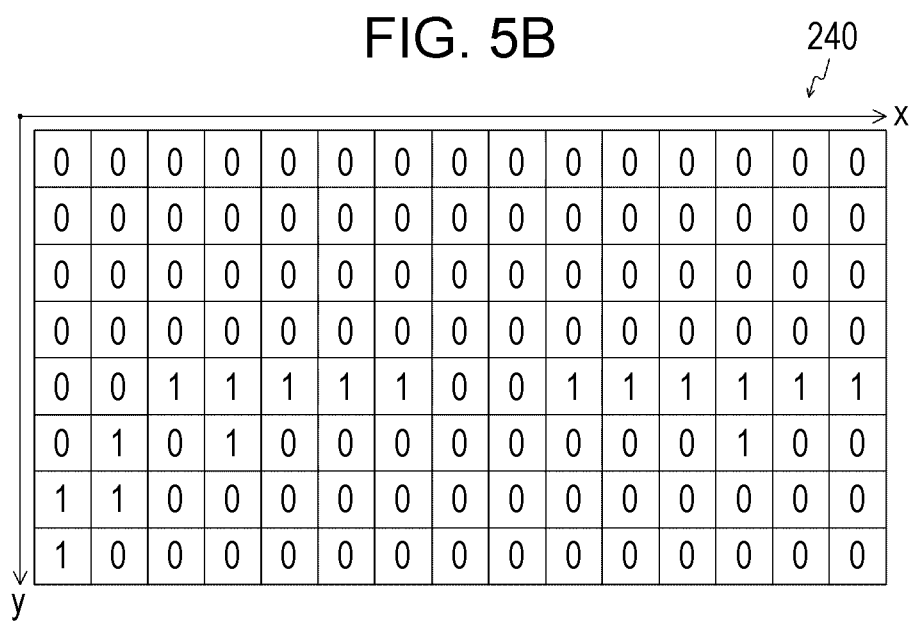

Example of Relationship Between Protective Barrier Region and Protective Barrier Region Information FIGS. 5A and 5B are diagrams which illustrate an example of a relationship between the protective barrier region information which is stored in the storage unit 110 and a protective barrier region according to the first embodiment of the present technology.

In FIG. 5A, the protective barrier region 212 on the background image is illustrated. In addition, the protective barrier region 212 is the same as that in FIG. 2B.

In FIG. 5B, protective barrier region information 240 corresponding to the protective barrier region 212 which is illustrated in FIG. 5A is illustrated. Here, the protective barrier region information 240 is information for specifying the protective barrier region 212. In addition, in FIG. 5B, similarly to FIG. 4B, the protective barrier region information 240 which specifies the protective barrier region 212 using a feature amount (for example, luminance value of pixels corresponding to each set of coordinates in protective barrier region 212) is illustrated as an example. In addition, in FIG. 5B, for ease of description, coordinates corresponding to a background image are schematically illustrated using 120 rectangles (8×15), similarly to in FIG. 4B. In addition, in each rectangle, "1" is attached to the protective barrier region 212, and regions except for the protective barrier region are illustrated by having "0" attached.

In addition, the registered region information 230 which is illustrated in FIG. 4B, and the protective barrier region information 240 which is illustrated in FIG. 5B are stored in the storage unit 110 by being correlated with each other.

In this manner, according to the first embodiment of the present technology, the example in which the registered region information and the protective barrier region information which specify the registered region and the protective barrier region using a feature amount are stored in the storage unit 110 is illustrated. However, registered region information and protective barrier region information which specify the registered region and the protective barrier region using image information may be stored in the storage unit 110.

Detection Example of Object

Figures 6A, 6B:
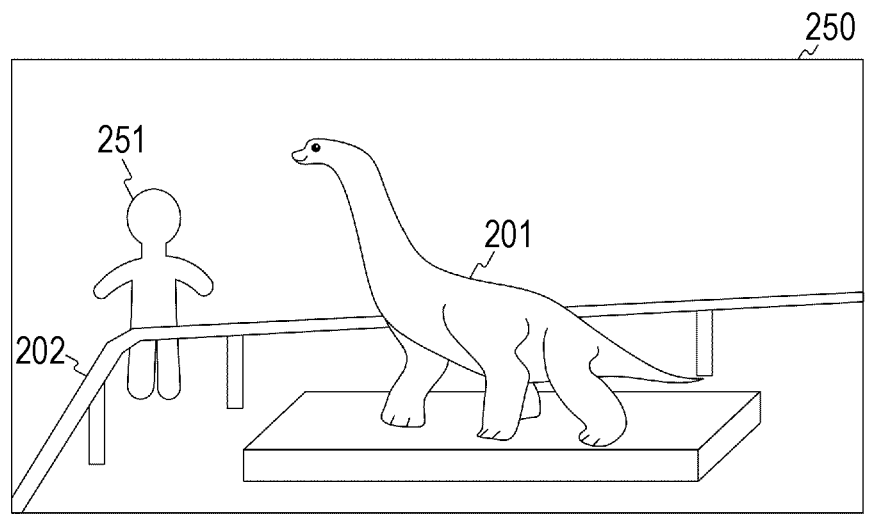
FIGS. 6A and 6B are diagrams which illustrate a detection result of an object detection process by a detection unit according to the embodiment of the present technology.

FIGS. 6A and 6B are diagrams which illustrate a detection result of an object detection process using the detection unit 140, according to the first embodiment of the present technology.

In FIG. 6A, an image 250 which is obtained by the image obtaining unit 130 is illustrated. In addition, it is assumed that a person 251 is included in the image 250. For this reason, the detection unit 140 detects the person 251 from the image 250.

In FIG. 6B, object detection information 260 corresponding to the person 251 which is detected in the image 250 in FIG. 6A is illustrated. Here, the object detection information is information for specifying a region corresponding to the object which is detected by the detection unit 140. In addition, in FIG. 6B, similarly to in FIG. 4B, the object detection information 260 which specifies the region corresponding to the person 251 which is detected in the image 250 using a feature amount is illustrated as an example. In addition, for ease of description, in FIG. 6B, similarly to in FIG. 4B, coordinates corresponding to a background image are schematically illustrated using 120 rectangles (8×15). In addition, in each rectangle, "1" denotes regions corresponding to the person 251, and regions except for the person 251 are illustrated by having "0" attached.

Example of Determining Intrusion of Object

As illustrated in FIGS. 6A and 6B, when the person 251 is detected in the image 250, the detection unit 140 outputs the object detection information 260 relating to the detected person 251 to the determination unit 150. Subsequently, the determination unit 150 determines whether or not the detected person 251 and the registered region 211 (illustrated in FIG. 4A) overlap with each other based on the registered region information 230 stored in the storage unit 110 (illustrated in FIG. 4B), and the object detection information 260.

In the example which is illustrated in FIG. 6A, the detected person 251 and the registered region 211 (illustrated in FIG. 4A) overlap with each other. In this case, the determination unit 150 determines whether or not the detected person 251 and the protective barrier region 212 (illustrated in FIG. 5A) overlap with each other based on the protective barrier region information 240 (illustrated in FIG. 5B) which is stored in the storage unit 110, and the object detection information 260.

In the example which is illustrated in FIG. 6A, the detected person 251 and the protective barrier region 212 (illustrated in FIG. 5A) overlap with each other. In this case, the determination unit 150 compares a feature amount in the image 250 and a feature amount in the protective barrier region information 240 (illustrated in FIG. 5B) with each other with respect to an overlapped region thereof (for example, region corresponding to coordinates which are surrounded by thick rectangle 261 illustrated in FIG. 6B). Subsequently, the determination unit 150 calculates a difference value of feature amounts in the overlapped region based on a comparison result thereof. For example, when luminance is used as a feature amount, the determination unit 150 calculates a difference value between a luminance value in the image 250 and a luminance value in the protective barrier region information 240 in each pixel, with respect to the overlapped region. In addition, the determination unit 150 adds up an absolute value of a difference value in each pixel which is calculated, and calculates a total value of an absolute value of a difference value of each pixel which configures the overlapped region.

Here, when a total value thereof is equal to or smaller than a threshold value, it is assumed that the overlapped region in the image 250 and the overlapped region in the protective barrier region are approximately the same image. In this case, it is assumed that the detected object is present in a region which is farther from a protective barrier corresponding to the protective barrier region (present in distant side), by using a position of an apparatus which images the image 250 (for example, image processing apparatus 100) as a reference. That is, it is assumed that the detected object has not intruded into the registered region.

On the other hand, when the total value exceeds the threshold value, it is assumed that the overlapped region in the image 250 and the overlapped region in the protective barrier region are different images. In this case, it is assumed that the detected object is present in a region which is closer than the protective barrier corresponding to the protective barrier region (present at near side), by using the position of the apparatus which images the image 250 (for example, image processing apparatus 100) as a reference. That is, it is assumed that the detected object has intruded into the registered region.

Therefore, the determination unit 150 determines whether or not the total value is equal to or smaller than the threshold value. In addition, when the total value is equal to or smaller than the threshold value, the determination unit 150 determines that the detected object has not intruded into the registered region. On the other hand, when the total value exceeds the threshold value, the determination unit 150 determines that the detected object has intruded into the registered region.

In this manner, when the object which is detected in the image obtained by the image obtaining unit 130 overlaps with the registered region, for example, it is possible to accurately determine whether or not the object has intruded into the intrusion prohibition region.

Subsequently, the determination unit 150 outputs a determination result thereof to the output unit 160. In addition, the output unit 160 outputs a determination result from the determination unit 150. For example, the output unit 160 outputs the determination result, using a display on the display unit, or a sound output from a sound output unit. For example, the output unit 160 can output the determination result by making a screen on a display unit red, and performing a flashing display. In addition, the output may be displayed by coloring a region of the object which has intruded into the intrusion prohibition region using a specific color (for example, red). In addition, for example, the output unit 160 can output the determination result by performing a sound output denoting an abnormal occurrence.

For example, in the example which is illustrated in FIG. 6A, the detected person 251 is present in a region which is farther than the protective barrier (fence 202) (present in distant side) corresponding to the protective barrier region 212 (illustrated in FIG. 5A) by using a position of the apparatus which images the image 250 (for example, image processing apparatus 100) as a reference. For this reason, the overlapped region in the image 250 and the overlapped region in the protective barrier region information 240 (illustrated in FIG. 5B) become approximately the same image. In this case, a total value of absolute values of difference values relating to the overlapped region in the image 250 and the overlapped region in the protective barrier region information 240 becomes equal to or smaller than the threshold value. For this reason, the determination unit 150 determines that the detected person 215 has not intruded into the registered region.

In addition, when the detected object and the registered region do not overlap with each other, it is assumed that the detected object has not intruded into the registered region. For this reason, when the detected object and the registered region do not overlap with each other, the determination unit 150 determines that the detected object has not intruded into the registered region.

In addition, when the detected object and the registered region overlap with each other, and the detected object and the protective barrier region do not overlap with each other, it is assumed that the detected object has completely intruded into the registered region. For this reason, when the detected object and the registered region overlap with each other, and the detected object and the protective barrier region do not overlap with each other, the determination unit 150 determines that the detected object has intruded into the registered region.

In addition, in the example, an example in which a luminance value is used as a feature amount which is used when performing the intrusion determination process of an object has been described, however, another feature amount may be used. As a feature amount which is used when performing the intrusion determination process of an object, for example, it is possible to use an RGB value of each pixel which configures an image. In addition, when performing the intrusion determination process of an object using these feature amounts, threshold processing, or the like, may be performed in order to allow an error.

In addition, in the example, an example in which each process (object detection process, intrusion determination process of object) is performed using the image (for example, imaged image which is generated using imaging apparatus) which is obtained by the image obtaining unit 130 has been described, however, each process may be performed using a reduced image of the image. In addition, as an image used in each process, images except for the imaged image (for example, color image of RGB, or the like, image with only luminance information, and image subjected to image processing in which image is made into edge image (for example, edge extraction image)) may be used.

Operation Example of Image Processing Apparatus

FIG. 7 is a flowchart which illustrates an example of a processing procedure of the intrusion determination process of an object by the image processing apparatus 100 according to the first embodiment of the present technology. In addition, in FIG. 7, a case in which a protective barrier (object corresponding to protective barrier region) is provided at a boundary of the registered region is illustrated as an example.

First, the detection unit 140 performs the object detection process with respect to an image which is obtained by the image obtaining unit 130 (step S910). In addition, the object detection process will be described in detail with reference to FIG. 8. In addition, step S910 is an example of a detection procedure which is described in claims.

Subsequently, the determination unit 150 determines whether or not an object is detected from the image which is obtained by the image obtaining unit 130 based on a detection result using the detection unit 140 (step S901). In addition, when an object is not detected (step S901), the process returns to step S910.

In addition, when an object is detected (step S901), the determination unit 150 determines whether or not the object and the registered region overlap with each other (step S902). In addition, when the detected object and the registered region do not overlap with each other (step S902), since it is assumed that the detected object has not intruded into the registered region, the determination unit 150 determines that there is no intrusion (step S907).

In addition, when the detected object and the registered region overlap with each other (step S902), the determination unit 150 determines whether or not the detected object and the protective barrier region overlap with each other (step S903). In addition, when the detected object and the protective barrier region do not overlap with each other (step S903), since it is assumed that the detected object has completely intruded into the registered region, the determination unit 150 determines that there is intrusion (step S906).

In addition, when the detected object and the protective barrier region overlap with each other (step S903), the determination unit 150 compares feature amounts in the overlapped region (for example, luminance value) (step S904). That is, the determination unit 150 compares a feature amount in the overlapped region of an image which is obtained by the image obtaining unit 130 and a feature amount in the overlapped region of the protective barrier region information (for example, protective barrier region information 240 illustrated in FIG. 5B) with each other (step S904).

Subsequently, the determination unit 150 determines whether or not a total value of absolute values of difference values which is calculated due to the comparison is equal to or smaller than a threshold value (step S905). In addition, when the total value exceeds the threshold value (step S905), since it is assumed that the detected object has intruded into the registered region, the determination unit 150 determines that there is intrusion (step S906). On the other hand, when the total value is equal to or smaller than the threshold value (step S905), since it is assumed that the detected object has not intruded into the registered region, the determination unit 150 determines that there is no intrusion (step S907). In addition, steps S902 to S907 are examples of a determination procedure which is described in claims.

Subsequently, the output unit 160 outputs a determination result from the determination unit 150 (step S908). For example, the output unit 160 outputs the determination result using a display on the display unit, or a sound output from the sound output unit (step S908).

Subsequently, whether or not an instruction of ending the operation of the intrusion determination process of an object is performed is determined (step S909), and when the instruction of ending is not made, the process returns to step S910. On the other hand, when the instruction of ending is made (step S909), the operation of the intrusion determination process of the object is ended.

Figure 8:
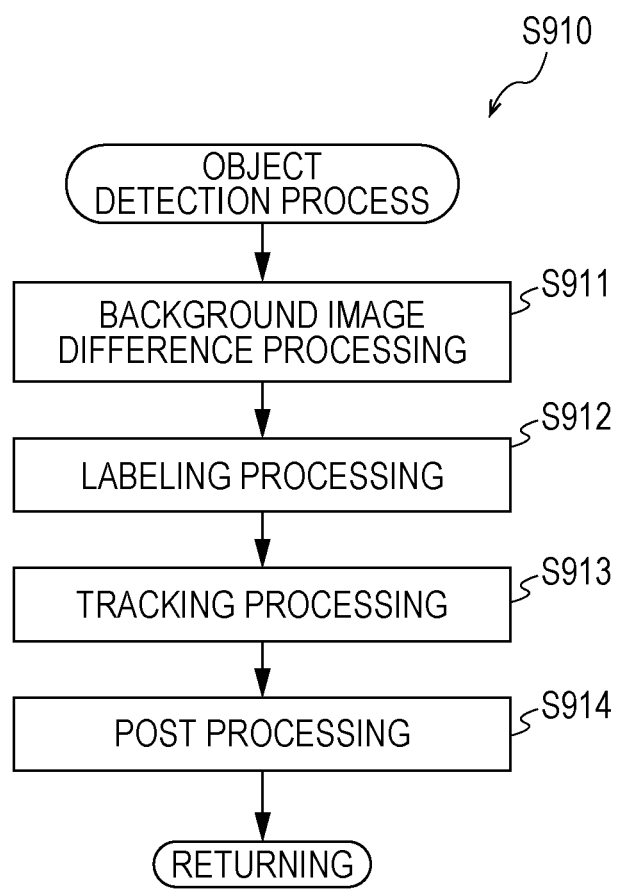
FIG. 8 is a flowchart which illustrates an example of the object detection process in the intrusion determination process of an object by the image processing apparatus according to the embodiment of the present technology.

FIG. 8 is a flowchart which illustrates an example of the object detection process (process procedure of step S910 illustrated in FIG. 7) in the intrusion determination process of an object using the image processing apparatus 100 according to the first embodiment of the present technology. In addition, in FIG. 8, a moving object detection process in which an object with a motion is detected is illustrated as an example of the object detection process.

First, the detection unit 140 performs background image difference processing with respect to an image which is obtained by the image obtaining unit 130 (step S911).

Subsequently, the detection unit 140 performs labeling processing with respect to a region corresponding to an object (object region) which is detected by the background image difference processing (step S912). The labeling processing is, for example, processing in which the same identification information is given to a region which is connected, since the connected region is recognized as the same object among objects which are detected due to the background image difference processing.

Subsequently, the detection unit 140 performs tracking processing with respect to the object region in which the labeling processing is performed (step S913). The tracking processing is, for example, processing in which a motion of the object which is detected by the background image difference processing is predicted with reference to a position of the previous frame.

Subsequently, the detection unit 140 performs post processing with respect to the object region in which the tracking processing is performed (step S914). The post processing is processing for definitely deciding a moving object which is a detection target. As the post processing, for example, each of processes such as a noise removing process, and a shadow determining process is performed, and objects except for the moving object as the detection target are removed.

In addition, in FIG. 8, as an example of the object detection process, a moving object detection process in which an object with a motion is detected is described, however, the object (for example, airplane, vehicle, and human body) may be detected using another detection method. For example, it is possible to use a detection method in which detection of an object is performed using HISTOGRAMS OF ORIENTED GRADIENTS (HOG) (for example, refer to Japanese Unexamined Patent Application Publication No. 2010-067102).

Here, for example, a real world of a three dimensional space is expressed as a two dimensional space which is photographed using a camera. In an image which is expressed as the two dimensional space, an object which is at a near side is expressed in an overlapped state with respect to an object which is at a distant side in the depth direction of an image (optical axis direction of camera). That is, in an image which is expressed as the two dimensional space, the object which is at the near side shields the object which is at the distant side in the depth direction of the image. For this reason, when detecting an object which is at the distant side in the depth direction of the image, there is a concern that a presence of a protective barrier may lower detection precision thereof.

In addition, for example, providing of a camera for performing photographing from a direction orthogonal to the depth direction (transverse direction) can also be taken into consideration, in order to accurately determine an object which is at the distant side, and an object which is at the near side in the depth direction of an image. For example, providing of a camera which performs photographing from the transverse direction with respect to the intrusion prohibition region can be taken into consideration. However, a plurality of cameras are necessary in this case. In addition, there also is a concern that places for providing the plurality of cameras may be limited.

Therefore, according to the first embodiment of the present technology, the protective barrier region (for example, region corresponding to fence 202 illustrated in FIGS. 2A and 2B) is set, and protective barrier region information relating thereto (for example, protective barrier region information 240 illustrated in FIG. 5B) is stored. In addition, it is possible to determine a positional relationship between the detected object and the protective barrier (background structure) in the depth direction using the protective barrier region information also in an image which is expressed two-dimensionally. In this manner, it is possible to enhance detection precision of a position of an object in the three dimensional space. That is, it is possible to judge a situation of a three dimensional space with high precision, even from a two dimensional space, using protective barrier region information relating to a protective barrier which is set by a user in a determination.

In addition, it is possible to accurately determine whether or not the object (for example, person) which is detected in the image obtained by the image obtaining unit 130 has intruded into the registered region (for example, intrusion prohibition region). In this manner, it is possible to avoid erroneous detection in the intrusion prohibition region. That is, it is possible to enhance detection precision of an object.

In addition, for example, it is possible to determine a positional relationship in the depth direction using only photographing from the front side with respect to the intrusion prohibition region. For example, as illustrated in FIGS. 2A and 2B, even when the intrusion prohibition region is rounded in a circle shape, it is possible to detect intrusion due to a determination of the depth using photographing from the front side. In this manner, it is possible to reduce a limit when providing the image processing apparatus. In other words, it is possible to widen an installation space of the image processing apparatus. That is, it is possible to perform a relatively free camera layout.

In addition, in the first embodiment of the present technology, the image processing apparatus 100 in which an imaging range which is a monitoring target is fixed has been described as an example. However, for example, it is also possible to apply the first embodiment of the present technology to an image processing apparatus which is capable of moving the imaging range as the monitoring target (for example, oscillating surveillance camera which oscillates in horizontal direction). For example, an oscillating angle (for example, angle of optical axis in horizontal direction), and each piece of information (background image information, registered region information, and protective barrier region information) are stored by being correlated with each other. In addition, when performing each process, each process is performed using each piece of information which is stored by being correlated with an oscillating angle corresponding to a time of the process at the time.

2. Second Embodiment

In the first embodiment of the present technology, the example in which the intrusion determination process of an object is performed using the protective barrier region information has been described. Here, for example, it is considered that it is also possible to perform an occlusion determination process (process of determining whether or not there is overlap in moving object) in a moving object detection process using the protective barrier region information.

Therefore, in a second embodiment of the present technology, an example in which the occlusion determination process is performed using the protective barrier region information will be described. In addition, an image processing apparatus according to the second embodiment of the present technology is common to the image processing apparatus 100 (illustrated in FIG. 1) according to the first embodiment of the present technology. For this reason, common portions to those in the image processing apparatus 100 will be given the same reference numerals, and a part of descriptions of these will be omitted.

Figure 9A:
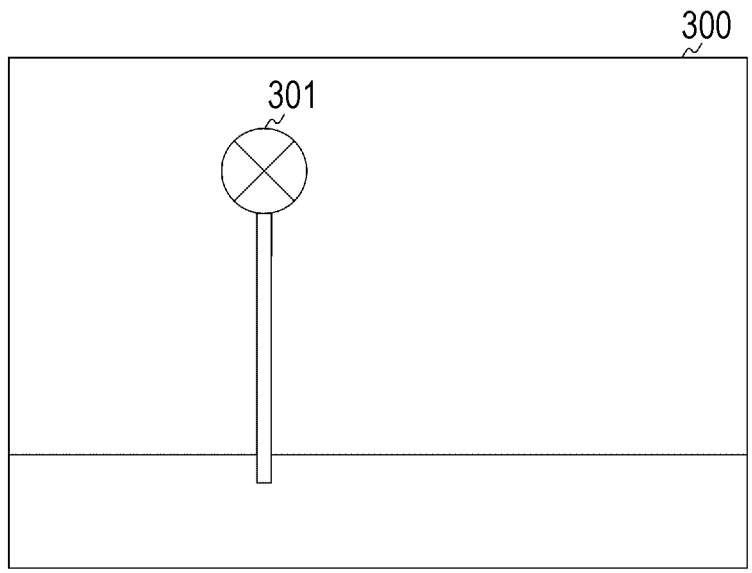
FIGS. 9A and 9B are diagrams which illustrate an example of a relationship between protective barrier region information and a protective barrier region which are stored in a storage unit according to a second embodiment of the present technology.
Figure 9B:
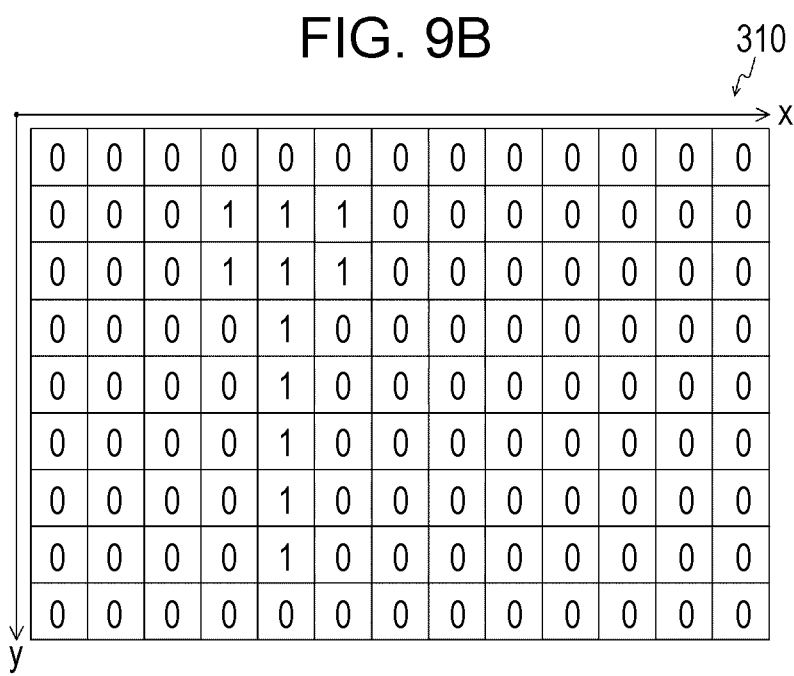

Example of Relationship Between Protective Barrier Region and Protective Barrier Region Information FIGS. 9A and 9B are diagrams which illustrate an example of a relationship between protective barrier region information which is stored in a storage unit 110 and a protective barrier region according to the second embodiment of the present technology.

Figure 10A:
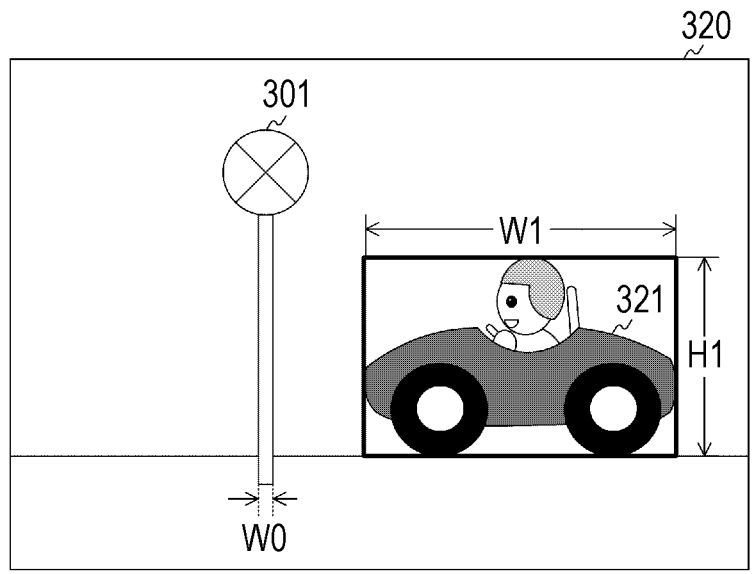
FIGS. 10A and 10B are diagrams which illustrate a detection result of a moving object detection process by a detection unit according to the second embodiment of the present technology.

FIG. 9A illustrates a protective barrier region 301 on a background image 300. In addition, the protective barrier region 301 corresponds to the protective barrier region 212 which is illustrated in FIG. 2B. In addition, the protective barrier region 301 is a sign which is provided on a road. In addition, as illustrated in FIG. 10A, a size of a stick shaped portion of the protective barrier region 301 in the horizontal direction is set to W0.

FIG. 9B illustrates protective barrier region information 310 corresponding to the protective barrier region 301 which is illustrated in FIG. 9A. Here, the protective barrier region information 310 is information for specifying the protective barrier region 301. In addition, similarly to FIG. 4B, in FIG. 9B, the protective barrier region information 310 which specifies a protective barrier region corresponding to the protective barrier region 301 using a feature amount (for example, 1) is described as an example. In addition, in FIG. 9B, for ease of description, coordinates corresponding to a background image are schematically illustrated using 117 rectangles (9×13). In addition, in each rectangle, "1" denotes the protective barrier region 301, and regions except for the protective barrier region 301 are illustrated by having "0" attached.

In addition, a setting method of the protective barrier region information 310 is the same as that in the protective barrier region information according to the first embodiment of the present technology. In addition, the protective barrier region information 310 is stored in the storage unit 110.

Detection Example of Moving Object

FIGS. 10A to 11B are diagrams which illustrate a detection result of a moving object detection process using a detection unit 140 according to the second embodiment of the present technology.

The detection unit 140 performs the moving object detection process in which a moving object is detected. As the moving object detection process, for example, it is possible to perform the moving object detection process illustrated in FIG. 8.

FIG. 10A illustrates an image 320 which is obtained by the image obtaining unit 130. In addition, the image 320 includes a car 321 which is running. For this reason, the detection unit 140 detects the car 321 from the image 320. In addition, the detection unit 140 detects a size thereof along with the car 321. For example, the detection unit 140 detects a size H1 in the vertical direction, and a size W1 in the horizontal direction as the size of the car 321. In addition, the detection unit 140 outputs moving object detection information relating to the detected car 321 to the determination unit 150. Here, the moving object detection information is information for specifying a region corresponding to a moving object which is detected by the detection unit 140, and includes information for specifying a position and the size of the car 321 in the background image.

Figure 10B:
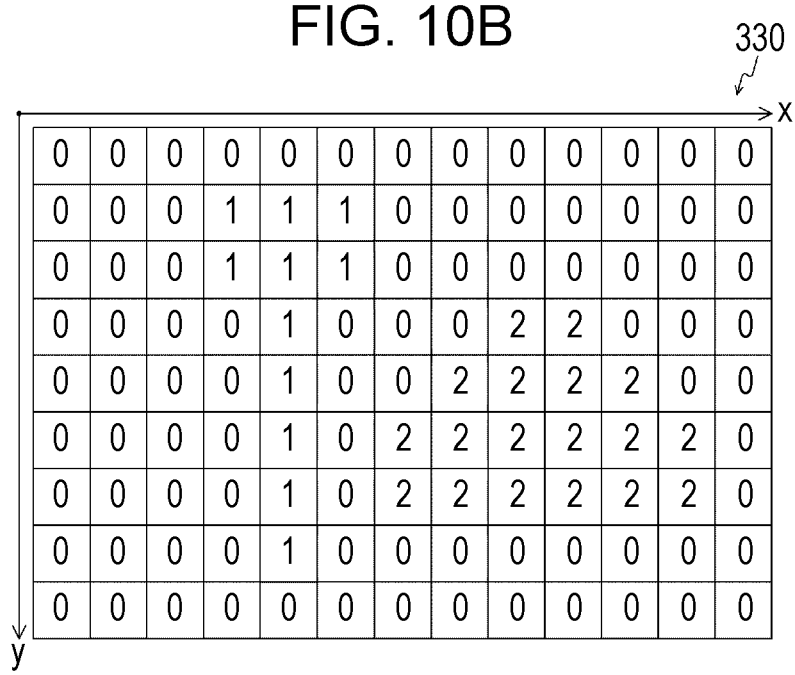

FIG. 10B illustrates information 330 which includes moving object detection information corresponding to the car 321 which is detected in the image 320 illustrated in FIG. 10A, and protective barrier region information 310. In addition, in FIG. 10B, the information 330 which specifies a region corresponding to the car 321 which is detected in the image 320, and the protective barrier region 301 using a feature amount is described as an example. In addition, in FIG. 10B, for ease of description, coordinates corresponding to a background image are schematically illustrated using 117 rectangles (9×13), similarly to FIG. 9B. In addition, in each rectangle, "2" denotes regions corresponding to the car 321, "1" denotes protective barrier regions corresponding to the protective barrier region 301, and regions except for these are illustrated by having "0" attached.

In addition, the determination unit 150 maintains the moving object detection information relating to the moving object (for example, car 321) which is detected by the detection unit 140 for a predetermined period of time. In addition, the determination unit 150 uses the maintained moving object detection information when performing an occlusion determination process.

Figure 11A:
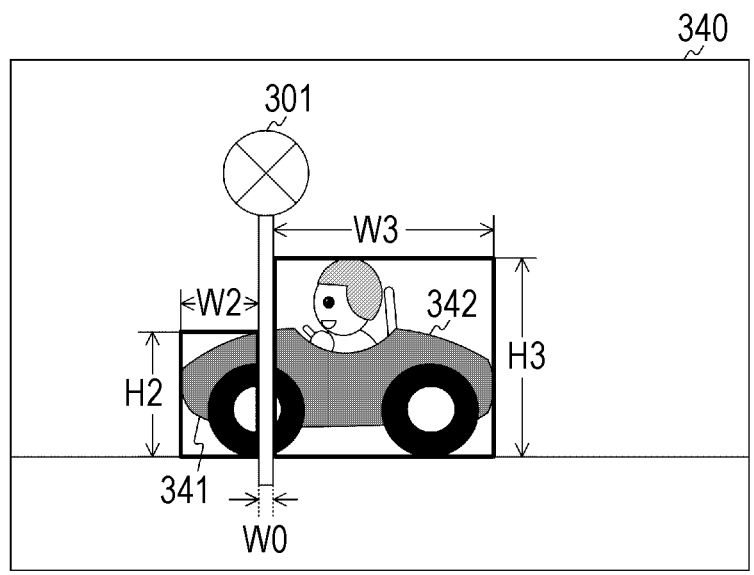
FIGS. 11A and 11B are diagrams which illustrate the detection result of the moving object detection process by the detection unit according to the second embodiment of the present technology.

In FIG. 11A, an image 340 which is obtained by the image obtaining unit 130 is illustrated. The image 340 is an image which is obtained after the car 321 which is included in the image 320 illustrated in FIG. 10A has moved. Here, the car 321 is included in the image 340, however, it is assumed that the car 321 is divided due to moving by the protective barrier region 301. For this reason, the detection unit 140 detects the car 321 from the image 340, however, the car 321 is detected as two moving bodies 341 and 342. In this case, for example, the detection unit 140 detects a size H2 in the vertical direction and a size W2 in the horizontal direction as sizes of the moving object 341 (car 321 on front side). In addition, the detection unit 140 detects a size H3 in the vertical direction and a size W3 in the horizontal direction as sizes of the moving object 342 (car 321 on rear side). In addition, the detection unit 140 outputs the moving object detection information relating to the detected moving object 341 (including information for specifying position and size of moving object 341 in background image) to the determination unit 150. Similarly, the detection unit 140 outputs the moving object detection information relating to the detected moving object 342 (including information for specifying position and size of moving object 342 in background image) to the determination unit 150.

Figure 11B:
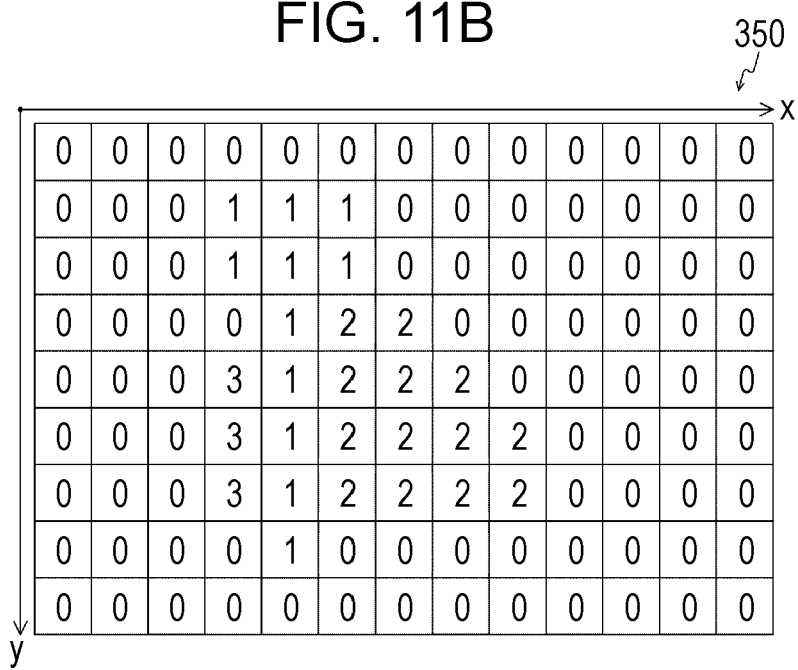

FIG. 11B illustrates information 350 which includes moving object detection information corresponding to the two moving bodies 341 and 342 which are detected in the image 340 illustrated in FIG. 11A, and the protective barrier region information 310. In FIG. 11B, similarly to FIG. 10B, information 350 which specifies regions corresponding to the two moving bodies 341 and 342 which are detected in the image 340, and the protective barrier region 301 using a feature amount is illustrated as an example. In addition, in FIG. 11B, for ease of description, coordinates corresponding to the background image are schematically illustrated using 117 rectangles (9×13), similarly to FIG. 9B. In addition, in each rectangle, "3" denotes regions corresponding to the moving object 341, "2" denotes regions corresponding to the moving object 342, "1" denotes the protective barrier region 301, and regions except for these are illustrated by having "0" attached.

Example of Determining Occlusion

As illustrated in FIG. 11A, when neighboring moving bodies 341 and 342 are detected in the protective barrier region 301, there is a possibility of an occurrence of occlusion. Therefore, when the neighboring moving bodies 341 and 342 are detected in the protective barrier region 301, the determination unit 150 performs an occlusion determination process.

First, the determination unit 150 determines whether or not the detected moving object is close to both sides of a protective barrier which is registered. In addition, when the detected moving object is not close to both sides of the registered protective barrier, the determination unit 150 determines that the respective detected moving bodies are one moving object. For example, in FIG. 10A, the car 321 is not close to both sides of the registered protective barrier (protective barrier (sign) corresponding to protective barrier region 301). In this case, the determination unit 150 determines that the detected car 321 is one moving object.

In addition, when the detected moving object is close to both sides of the registered protective barrier, the determination unit 150 performs a comparison process using object detection information from the past which is maintained. Specifically, the determination unit 150 compares a size relating to the object detection information in the past which is maintained with sizes relating to object detection information of two moving objects which are close to both sides of the registered protective barrier. In addition, the determination unit 150 determines whether or not the two sizes as comparison targets are approximately the same (or the same).

Here, a comparison example of the two sizes will be described. For example, when a moving object which proceeds in the horizontal direction is set to a determination target, a difference value between a size in the horizontal direction relating to the object detection information in the past which is maintained and a total value of respective sizes of the two moving objects as a comparison target and the protective barrier in the horizontal direction is calculated. In addition, a difference value between a size in the vertical direction relating to the object detection information in the past which is maintained and a size in the vertical direction, of which a value is large between the two moving objects as the comparison target is calculated.

In addition, when both the difference value of the size in the horizontal direction and the difference value of the size in the vertical direction are equal to or smaller than a threshold value, the determination unit 150 determines that the two moving objects are one moving object. That is, the determination unit 150 determines that the two moving objects which are close to both sides of the registered protective barrier are one moving object.

For example, in the example which is illustrated in FIG. 11A, the car which moves in the horizontal direction is set to a determination target. For this reason, the determination unit 150 calculates a difference value between the size in the horizontal direction relating to the object detection information in the past which is maintained and a total value of respective sizes of the two moving objects 341, 342 as the comparison target and the protective barrier region 301 in the horizontal direction. For example, since the size of the protective barrier region 301 in the horizontal direction is W0, the total value of sizes of the two moving objects 341 and 342 as the comparison target and the protective barrier region 301 in the horizontal direction is W0+W2+W3. For this reason, the determination unit 150 calculates W1−(W0+W2+W3) as a difference value between the total value (W0+W2+W3) and the size W1 in the horizontal direction relating to the object detection information in the past which is maintained (illustrated in FIG. 10A). In addition, the determination unit 150 calculates a difference value (H1-H3) between the size of the object detection information in the past in the vertical direction which is maintained (H1 illustrated in FIG. 10A) and a size (H3) in the vertical direction of which a value is large between the two moving objects which are the comparison target.

Here, the size H1 in the vertical direction and the size H3 in the vertical direction are the same. For this reason, the difference value of the size (H1-H3) in the vertical direction becomes zero. That is, the difference value of the size (H1-H3) in the vertical direction is equal to or smaller than the threshold value.

In addition, the total value W1 of the sizes in the horizontal direction and the total value (W0+W2+W3) of the sizes in the horizontal direction are the same. For this reason, the difference value of the sizes in the horizontal direction (W1−(W0+W2+W3)) becomes zero. That is, the difference value of the sizes in the horizontal direction (W1−(W0+W2+W3)) is equal to or smaller than the threshold value.

In this manner, in the example illustrated in FIG. 11A, since both the difference value of sizes in the horizontal direction and the difference value of sizes in the vertical direction become equal to or smaller than the threshold value, the determination unit 150 determines that the two moving objects are one moving object. That is, the determination unit 150 determines that the two moving objects 341 and 342 which are close to both sides of the registered protective barrier are one moving object (car 321).

On the other hand, when at least one of the difference value of sizes in the horizontal direction and the difference value of sizes in the vertical direction exceeds the threshold value, the determination unit 150 determines that the two moving objects are two different moving objects. That is, the determination unit 150 determines that the two moving objects which are close to both sides of the registered protective barrier are two different moving objects.

In addition, in this example, the comparison process is performed based on the sizes in the horizontal direction and vertical direction, however, the comparison process may be performed based on another information.

For example, it may be also possible to determine whether or not two moving objects are the same moving object by performing a comparison process with respect to images relating to the moving object. For example, the comparison process may be performed by maintaining image information (for example, luminance value configuring image) relating to the detected moving object as object detection information in the past, and may be performed based on the image information (for example, luminance value configuring image relating to detected moving object). For example, the determination unit 150 may calculate an absolute value of a difference value of luminance of each pixel corresponding to the moving object as the comparison target. Specifically, the determination unit 150 calculates an absolute value of a difference value between a luminance value in each pixel corresponding to one moving object which was detected in the past and a luminance value in each pixel corresponding to two moving objects which are close to both sides of a protective barrier which is registered, for each pixel. Subsequently, the determination unit 150 calculates a total value of absolute values of difference values in each pixel. Subsequently the determination unit 150 determines whether or not the calculated total value is equal to or smaller than a threshold value.

In addition, when the calculated total value is equal to or smaller than the threshold value, the determination unit 150 determines that the two moving objects which become the comparison target are the same. In this case, the determination unit 150 determines that the two moving objects which are close to both sides of the registered protective barrier are one moving object.

On the other hand, when the calculated total value exceeds the threshold value, the determination unit 150 determines that the two moving objects which become the comparison target are not the same. In this case, the determination unit 150 determines that the two moving objects which are close to both sides of the registered protective barrier are two different moving objects.

In addition, whether or not the two moving objects are the same moving object may be determined by performing a comparison process of a feature amount of a region corresponding to the two moving objects which are close to both sides of the registered protective barrier without using the object detection information in the past.

For example, the determination unit 150 may generate a histogram (density histogram) with respect to a region of pixels of a predetermined number (for example, of five pixels) from the protective barrier in the horizontal direction, in the region corresponding to the two moving objects which become the comparison target. In addition, the histogram is a histogram in which, in a graph in which a horizontal axis denotes a density value, and a vertical axis denotes the number of pixels, each pixel which configures an image is arranged according to the density value. For example, the determination unit 150 generates a histogram with respect to the left region in the horizontal direction (for example, region of five pixels), and generates a histogram with respect to the right region in the horizontal direction (for example, region of five pixels). In addition, the determination unit 150 determines whether or not the two moving objects are the same moving object based on a degree of similarity of the two generated histograms.

For example, the determination unit 150 calculates an absolute value of a difference value of the number of pixels of the generated two histograms for each density value. In addition, the determination unit 150 calculates a total value of the absolute values of the difference values for each of the density values. Subsequently, the determination unit 150 determines whether or not the calculated total value is equal to or smaller than a threshold value.

In addition, when the calculated total value is equal to or smaller than the threshold value, the determination unit 150 determines that the two moving objects which become the comparison target are the same. In this case, the determination unit 150 determines that the two moving objects which are close to both sides of the registered protective barrier are one moving object.

On the other hand, when the calculated total value exceeds the threshold value, the determination unit 150 determines that the two moving objects which become the comparison target are not the same. In this case, the determination unit 150 determines that the two moving objects which are close to both sides of the registered protective barrier are two different moving objects.

Amended Example of Moving Object Detection Information

Figure 12:
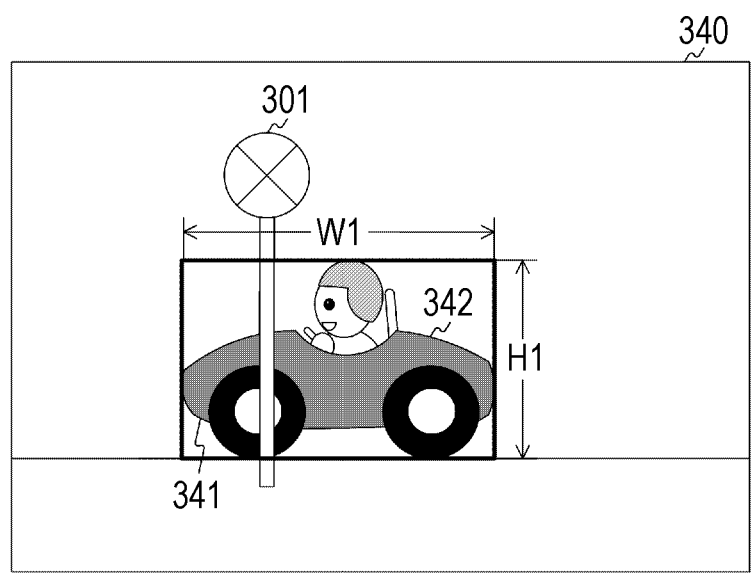
FIG. 12 is a diagram which illustrates an amended example of the moving object detection information amended by a determination unit according to the second embodiment of the present technology.

FIG. 12 is a diagram which illustrates an amended example of the moving object detection information amended using the determination unit 150 according to the second embodiment of the present technology.

As described above, when the two moving objects which are close to both sides of the registered protective barrier are determined to be one moving object, the determination unit 150 amends the moving object detection information which is output from the detection unit 140.

For example, in the example which is illustrated in FIG. 11A, a case in which the two moving objects 341 and 342 are determined to be one moving object is assumed. In this case, as illustrated in FIG. 12, the determination unit 150 performs an amendment of changing the object detection information of the two moving objects 341 and 342 to object detection information of one moving object. In addition, the determination unit 150 performs an amendment of changing the size relating to the object detection information in the past which is used in the determination process (size W1 in horizontal direction and size H1 in vertical direction) to sizes of the two moving objects 341 and 342.

Here, it is assumed that the protective barrier is larger than the moving object. In this case, it is assumed that the moving object which was detected in the past is completely hidden by the protective barrier. Even in such a case, it is possible to obtain a moving vector of the moving object based on the moving object which was detected in the past. Therefore, it is possible to assume that the moving object is present at the rear of the protective barrier based on the moving vector of the moving object which was detected in the past. In this manner, when it is assumed that the moving object is present at the rear of the protective barrier, it is possible to determine that there is occlusion, not determining that the moving object is lost.

Operation Example of Image Processing Apparatus

Figure 13:
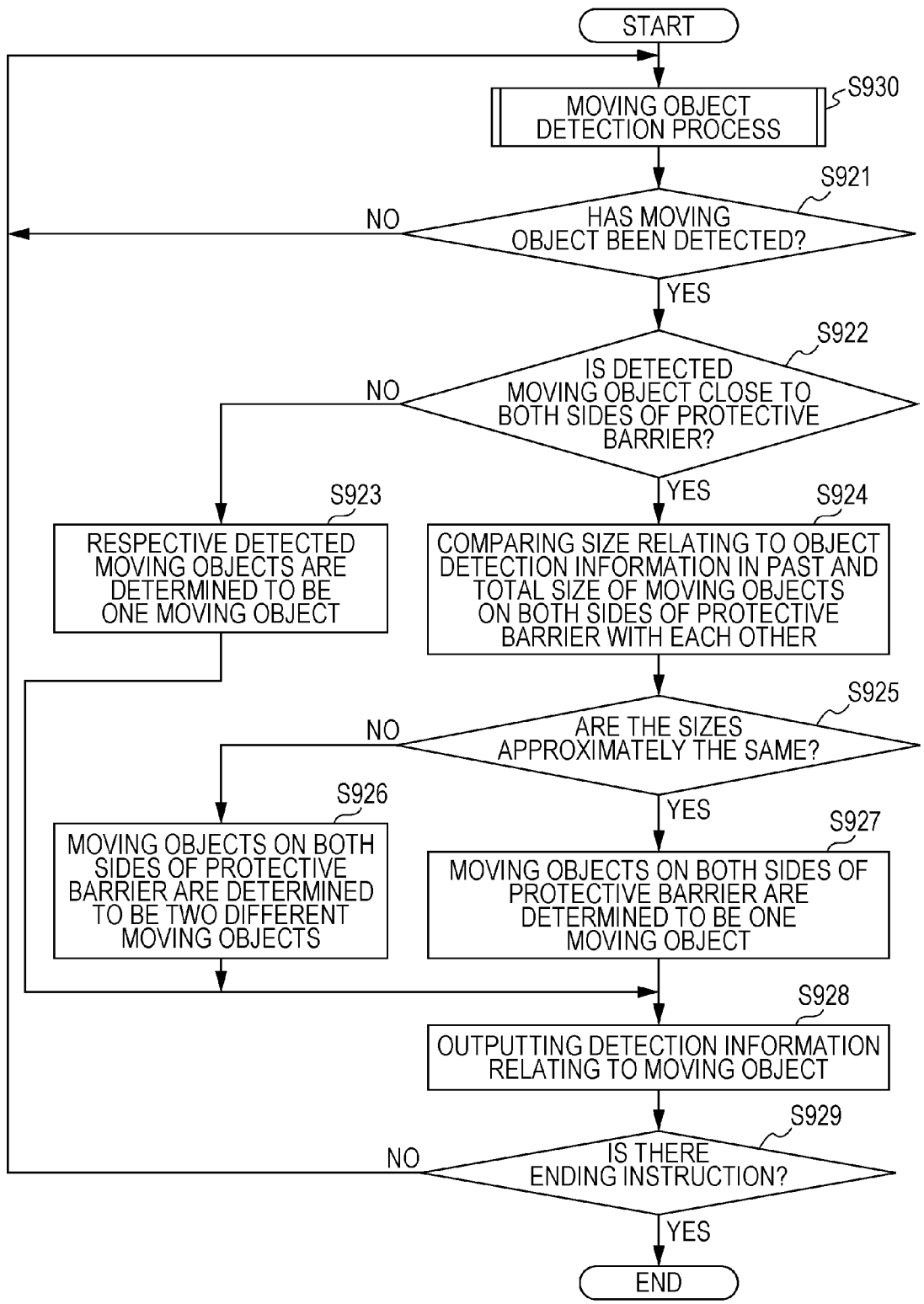
FIG. 13 is a flowchart which illustrates an example of a processing procedure of an occlusion determination process by the image processing apparatus according to the second embodiment of the present technology.

FIG. 13 is a flowchart which illustrates an example of a processing procedure of an occlusion determination process using the image processing apparatus 100 according to the second embodiment of the present technology.

First, the detection unit 140 performs a moving object detection process with respect to an image which is obtained by the image obtaining unit 130 (step S930). In addition, the moving object detection process is the same as the object detection process illustrated in FIGS. 8A and 8B.

Subsequently, the determination unit 150 determines whether or not a moving object is detected from the image which is obtained by the image obtaining unit 130 based on the detection result using the detection unit 140 (step S921). In addition, when the moving object is not detected (step S921), the process returns to step S930.

In addition, when the moving objects are detected (step S921), the determination unit 150 determines whether or not the detected moving objects are close to both sides of the registered protective barrier (step S922). In addition, when the detected moving objects are not close to both sides of the registered protective barrier (step S922), the determination unit 150 determines that the respective detected moving objects are one moving object (step S923).

In addition, when the detected moving objects are close to both sides of the registered protective barrier (step S922), the determination unit 150 performs a comparison process using the object detection information in the past which is maintained (step S924). That is, the determination unit 150 compares the size relating to the object detection information in the past which is maintained, and the size relating to the object detection information of the two moving objects which are close to both sides of the registered protective barrier to each other (step S924). Subsequently, the determination unit 150 determines whether or not the two sizes which become the comparison target are approximately the same (or the same) (step S925).

When the two sizes which become the comparison target are not approximately the same (step S925), the determination unit 150 determines that the two moving objects which are close to both sides of the registered protective barrier are two different moving objects (step S926). On the other hand, when the two sizes which become the comparison target are approximately the same (step S925), the determination unit 150 determines that the two moving objects which are close to both sides of the registered protective barrier are one moving object (step S927).

Subsequently, the output unit 160 outputs the determination result from the determination unit 150 (step S928). For example, the output unit 160 outputs the determination result using a display on a display unit, or a sound output from the sound output unit (step S928).

Subsequently, whether or not an ending instruction for ending the operation of the occlusion determination process is issued is determined (step S929). When the ending instruction is not issued, the process returns to step S930. On the other hand, when the ending instruction is issued (step S929), the operation of the occlusion determination process is ended.

In this manner, the determination unit 150 determines whether or not there is occlusion relating to the detected moving object in an image. In this case, for example, the determination unit 150 compares size information relating to the detected moving object, and size information relating to a moving object which is detected immediately before the moving object in the image to each other, and determines whether or not there is occlusion based on the comparison result. In addition, the determination unit 150 determines the plurality of moving objects which are close to both sides of the protective barrier region to be one moving object, when it is determined that there is occlusion.

In this manner, according to the second embodiment of the present technology, an existing protective barrier (for example, road sign) is set, and the occlusion determination process is performed using the protective barrier region information relating to the protective barrier. In this manner, it is possible to accurately determine whether two different moving objects are present, or one moving object is separated due to an occurrence of occlusion. In addition, it is possible to enhance detection precision of a moving object.

In addition, similarly to the first embodiment of the present technology, determining of whether or not there is occlusion relating to a moving object may be performed, only when determining that the moving object is present on the further distant side with respect to the protective barrier region, by determining a positional relationship between the moving object and the protective barrier region in the depth direction of an image.

3. Third Embodiment

In the first and second embodiments of the present technology, an example in which the image processing apparatus 100 is integrally configured has been described. However, it is also possible to apply the first and second embodiments of the present technology to an image processing system in which each function in the image processing apparatus 100 is executed by a plurality of devices.

Therefore, in a third embodiment of the present technology, an example of an image processing system which is configured of a plurality of devices will be described. In addition, each unit which configures the image processing system according to the third embodiment of the present technology corresponds to each unit which configures the image processing apparatus 100 illustrated in FIG. 1. For this reason, the fact will be indicated, and a part of descriptions of portions corresponding to the image processing apparatus 100 will be omitted.

Configuration Example of Image Processing System

Figure 14:
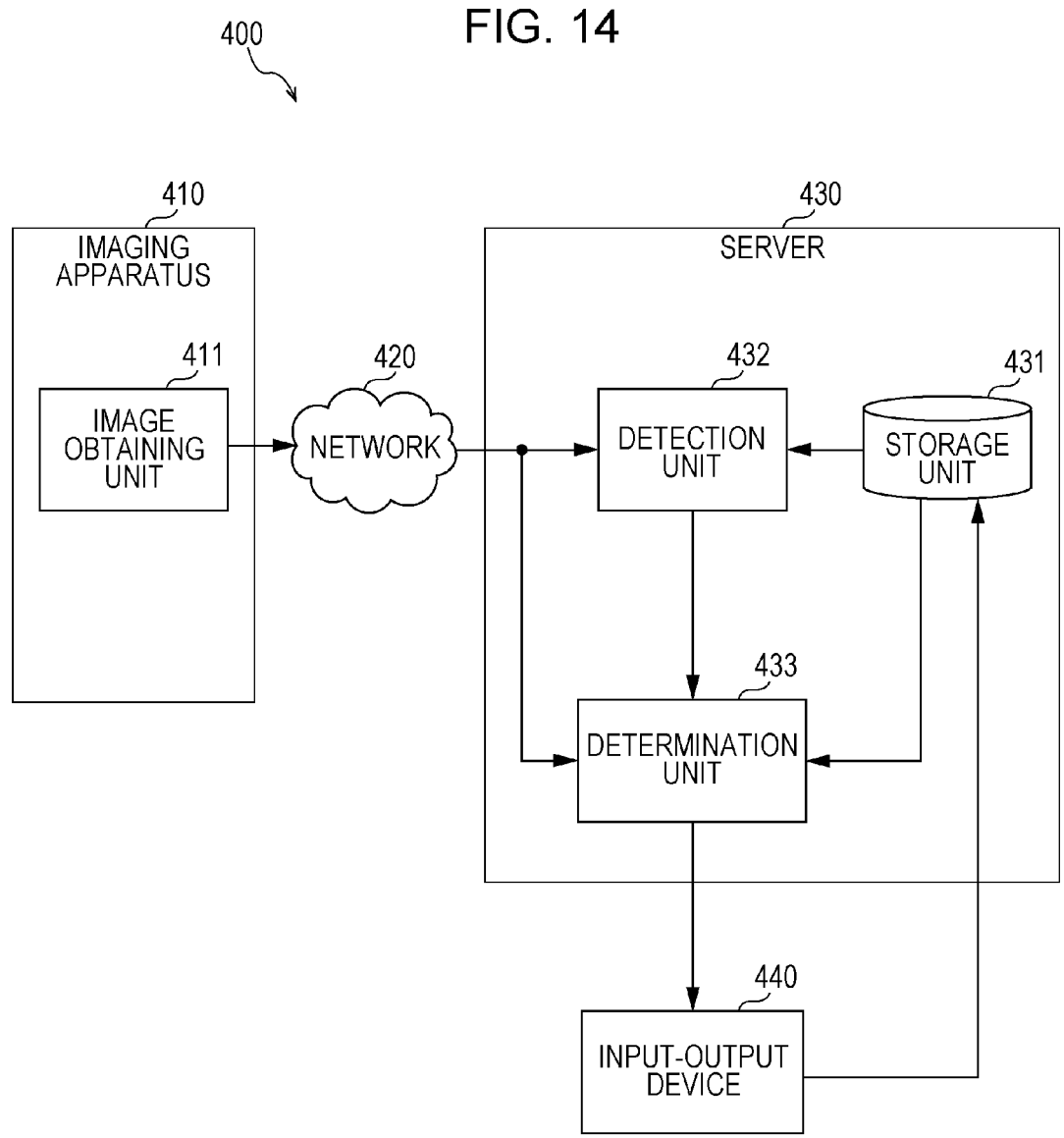
FIG. 14 is a diagram which illustrates a configuration example of an image processing system according to a third embodiment of the present technology.

FIG. 14 is a diagram which illustrates a configuration example of an image processing system 400 according to the third embodiment of the present technology.

The image processing system 400 includes an imaging apparatus 410, a network 420, a server 430, and an input-output device 440.

In addition, an image obtaining unit 411, a detection unit 432, a determination unit 433, and a storage unit 431 correspond to the image obtaining unit 130, the detection unit 140, the determination unit 150, and the storage unit 110 which are illustrated in FIG. 1, respectively.

In addition, the input-output device 440 corresponds to the setting unit 120 and the output unit 160 which are illustrated in FIG. 1. That is, the input-output device 440 sets the registered region and the protective barrier region, respectively. In addition, the input-output device 440 outputs a determination result which is output from the determination unit 433. For example, it is possible to output a determination result using a display unit which displays each image, or a sound output unit which outputs each piece of sound information.

The network 420 is a network for connecting the imaging apparatus 410 and the server 430. For example, the network 420 is a network such as a telephone network, the Internet, or the like (for example, public network). In addition, for example, the network 420 may be a wired network (for example, an Ethernet (registered trademark)), or a coaxial cable.

In this manner, the imaging apparatus 410 and the server 430 are connected to the image processing system 400 through the network 420. In addition, an image which is obtained by the image obtaining unit 411 of the imaging apparatus 410 is transmitted to the server 430 through the network 420.

That is, the image processing system 400 is an image processing system in which the object detection process and the intrusion determination process of an object (or, moving object detection process and occlusion determination process) are performed on the server 430 side. In addition, a part of each of the processes may be performed on the image apparatus side. This example is illustrated in FIG. 15.

Configuration Example of Image Processing System

Figure 15:
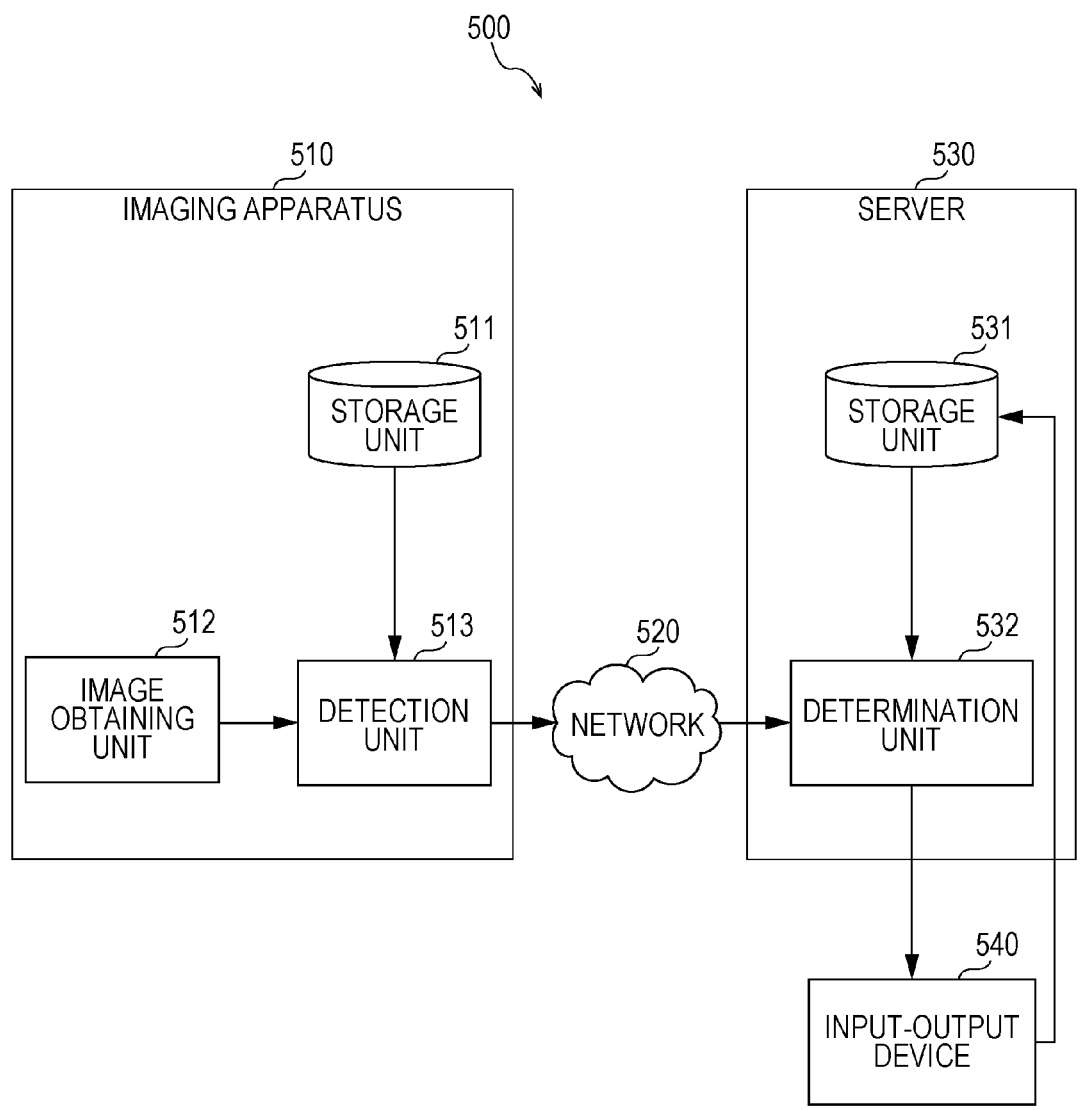
FIG. 15 is a diagram which illustrates a configuration example of an image processing system according to the third embodiment of the present technology.

FIG. 15 is a diagram which illustrates a configuration example of an image processing system 500 according to the third embodiment of the present technology.

The image processing system 500 includes an imaging apparatus 510, a network 520, a server 530, and an input-output device 540.

In addition, the image obtaining unit 512, the detection unit 513, the network 520, the determination unit 532, and the input-output device 540 correspond to the image obtaining unit 411, the network 420, the detection unit 432, the determination unit 433, and the input-output device 440 which are illustrated in FIG. 14, respectively. However, the input-output device 540 sets only a protective barrier region. In addition, the imaging apparatus 510 and the input-output device 540 may be connected through the network 520, and registered region may be set using the input-output device 540.

In addition, the storage units 511 and 531 correspond to the storage unit 431 which is illustrated in FIG. 14. That is, background image information is stored in the storage unit 511, and the stored background image information is supplied to the detection unit 513. In addition, registered region information and protective barrier region information are stored in the storage unit 531, and each piece of information which is stored is supplied to the determination unit 532.

In addition, the imaging apparatus 510 and the server 530 are connected to the image processing system 500 through the network 520. In addition, the detection unit 513 performs an object detection process (or, moving object detection process) with respect to an image which is obtained by the image obtaining unit 512 of the imaging apparatus 510. In addition, the detection unit 513 transmits the detection result to the server 530 through the network 520 along with the image which is obtained by the image obtaining unit 512.

In this manner, according to the third embodiment of the present technology, each process which is illustrated in the first and second embodiments of the present technology (object detection process and intrusion determination process of an object (or, moving object detection process and occlusion detection process)) is executed using a plurality of devices. For this reason, for example, the imaging apparatus is provided at each of a plurality of places which become the monitoring targets, and one server concentrates on images which are obtained by each of the imaging apparatuses, thereby performing each process.

In addition, the above described embodiments have illustrated an example for embodying the present technology, and matters in the embodiments and matters which specify the disclosure in claims have correspondence, respectively. Similarly, the matters which specify the disclosure in claims and matters with the same name as that according to the embodiment of the present technology have correspondence, respectively. However, the present technology is not limited to the embodiments, and can be embodied by performing various modifications in the embodiments without departing from the scope of the disclosure.

In addition, the processing procedure which is described in the above described embodiment may be treated as a method including a series of procedures of these, or may be treated as a program for executing the series of procedures in a computer, and a recording medium which stores the program. As the recording medium, it is possible to use, for example, a Compact Disc (CD), a Minidisc (MD), a Digital Versatile Disc (DVD), a memory card, a BLU-RAY DISC (registered trademark), or the like.

In addition, the present technology can also be configured as follows.

(1) An image processing apparatus which includes a detection unit which detects an object which is included in an image; and a determination unit which determines a positional relationship between a detected object and a protective barrier region in a depth direction of the image based on a feature amount relating to at least one of the detected object and the protective barrier region when the detected object and the protective barrier region overlap with each other in the image.

(2) The image processing apparatus which is described in (1), in which the determination unit compares a feature amount which is included in an overlapped region of the detected object in the image, and a feature amount which is included in the overlapped region in the protective barrier region which is stored in a storage unit with each other, with respect to the overlapped region of the detected object and the protective barrier region in the image, and determines the positional relationship based on the comparison result.

(3) The image processing apparatus which is described in (2), in which the determination unit compares a pixel which is included in the overlapped region of the detected object, and a pixel which is included in the overlapped region in the protective barrier region with each other, and determines the positional relationship based on a degree of similarity of the pixels in the overlapped region.

(4) The image processing apparatus which is described in any one of (1) to (3), in which the protective barrier region is a region of a protective barrier which is an object provided at a boundary of a registered region which is registered in the image, or in a vicinity of the boundary, and blocks the detected object, and the determination unit determines a positional relationship when the detected object and the registered region overlap with each other in the image, and the detected object and the protective barrier region overlap with each other in the image, and determines whether or not the detected object has intruded into the registered region based on the determination result.

(5) The image processing apparatus which is described in (1), in which the detection unit detects a moving object which is included in the image, and the determination unit determines whether or not there is occlusion relating to the detected moving object.

(6) The image processing apparatus which is described in (5), in which the determination unit determines whether or not there is the occlusion based on a comparison result produced by comparing size information relating to the detected moving object to size information relating to a moving object which is detected immediately before the moving object in the image.

(7) The image processing apparatus which is described in (5) or (6), in which the determination unit determines a plurality of moving objects which are close to both sides of the protective barrier region to be one moving object, when it is determined that there is the occlusion.

(8) An image processing method which includes detecting an object included in an image, and determining a positional relationship between the detected object and a protective barrier region in a depth direction of the image based on a feature amount relating to at least one of the detected object and the protective barrier region, when the detected object and the protective barrier region overlap with each other in the image.

(9) A program which causes a computer to execute detecting an object included in an image, and determining a positional relationship between the detected object and a protective barrier region in a depth direction of the image based on a feature amount relating to at least one of the detected object and the protective barrier region, when the detected object and the protective barrier region overlap with each other in the image.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   a processor; and
   a memory, the memory storing program code executable by the processor to perform operations comprising:
      detecting an object which is included in an image;
      determining a positional relationship by calculating a difference value between a feature amount of a detected object and a feature amount of a protective barrier region in a depth direction of the image relating to at least one of the detected object and the protective barrier region, when the detected object and the protective barrier region overlap with each other in the image; and
      calculating a total value of the difference value of each pixel of the overlap, wherein
      the detected object is present in the protective barrier region when the total value is greater than a threshold value and the detected object is not present in the protective barrier region when the total value is less than the threshold value.

2. The image processing apparatus according to claim 1, wherein operations further comprise:
   comparing a feature amount which is included in an overlapped region of the detected object in the image, and a feature amount which is included in the overlapped region in the protective barrier region which is stored in a storage unit with each other, with respect to the overlapped region of the detected object and the protective barrier region in the image, and determining the positional relationship based on the comparison result.

3. The image processing apparatus according to claim 2, wherein operations further comprise:
   comparing a pixel which is included in the overlapped region of the detected object, and a pixel which is included in the overlapped region in the protective barrier region with each other, and determining the positional relationship based on a degree of similarity of the pixels in the overlapped region.

4. The image processing apparatus according to claim 1, wherein operations further comprise:
   determining a positional relationship when the detected object and the registered region overlap with each other in the image, and the detected object and the protective barrier region overlap with each other in the image, and determining whether or not the detected object has intruded into the registered region based on the determination result, wherein
   the protective barrier region is a region of a protective barrier which is an object provided at a boundary of a registered region which is registered in the image, or in a vicinity of the boundary, and blocks the detected object.

5. The image processing apparatus according to claim 1, wherein operations further comprise:
   detecting a moving object which is included in the image, and
   determining whether or not there is occlusion relating to the detected moving object.

6. The image processing apparatus according to claim 5, wherein operations further comprise:
   determining whether or not there is the occlusion based on a comparison result produced by comparing size information relating to the detected moving object to size information relating to a moving object which is detected immediately before the moving object in the image.

7. The image processing apparatus according to claim 5, wherein operations further comprise:
   determining a plurality of moving objects which are close to both sides of the protective barrier region to be one moving object, when it is determined that there is the occlusion.

8. An image processing method for controlling an image processing apparatus the method comprising:
   detecting an object included in an image; and
   determining a positional relationship by calculating a difference value between a feature amount of a detected object and a feature amount of a protective barrier region in a depth direction of the image relating to at least one of the detected object and the protective barrier region, when the detected object and the protective barrier region overlap with each other in the image; and
   calculating a total value of the difference value of each pixel of the overlap, wherein
      the detected object is present in the protective barrier region when the total value is greater than a threshold value and the detected object is not present in the protective barrier region when the total value is less than the threshold value.

9. The image processing method according to claim 8, wherein operations further comprise comparing a feature amount which is included in an overlapped region of the detected object in the image, and a feature amount which is included in the overlapped region in the protective barrier region which is stored in a storage unit with each other, with respect to the overlapped region of the detected object and the protective barrier region in the image, and determining the positional relationship based on the comparison result.

10. The image processing method according to claim 9, wherein operations further comprise
    comparing a pixel which is included in the overlapped region of the detected object, and a pixel which is included in the overlapped region in the protective barrier region with each other, and determining the positional relationship based on a degree of similarity of the pixels in the overlapped region.

11. The image processing method according to claim 8, wherein operations further comprise:
    determining a positional relationship when the detected object and the registered region overlap with each other in the image, and the detected object and the protective barrier region overlap with each other in the image, and determining whether or not the detected object has intruded into the registered region based on the determination result, wherein
    the protective barrier region is a region of a protective barrier which is an object provided at boundary of a registered region which is registered in the image, or in a vicinity of the boundary, and blocks the detected object.

12. The image processing method according to claim 8, wherein operations further comprise:
    detecting a moving object which is included in the image, and
    determining whether or not there is occlusion relating to the detected moving object.

13. The image processing method according to claim 12, wherein operations further comprise determining whether or not there is the occlusion based on a comparison result produced by comparing size information relating to the detected moving object to size information relating to a moving object which is detected immediately before the moving object in the image.

14. The image processing method according to claim 12, wherein operations further comprise determining a plurality of moving objects which are close to both sides of the protective barrier region to be one moving object, when it is determined that there is the occlusion.

15. A non-transitory computer readable medium storing program code for image processing, the program code being executable by a processor to perform operations comprising:
    detecting an object included in an image; and
    determining a positional relationship by calculating a difference value between a feature amount of a detected object and a feature amount of a protective barrier region in a depth direction of the image relating to at least one of the detected object and the protective barrier region, when the detected object and the protective barrier region overlap with each other in the image; and
    calculating a total value of the difference value of each pixel of the overlap, wherein
       the detected object is present in the protective barrier region when the total value is greater than a threshold value and the detected object is not present in the protective barrier region when the total value is less than the threshold value.

16. The non-transitory computer-readable medium according to claim 15, wherein operations further comprise comparing a feature amount which is included in an overlapped region of the detected object in the image, and a feature amount which is included in the overlapped region in the protective barrier region which is stored in a storage unit with each other, with respect to the overlapped region of the detected object and the protective barrier region in the image, and determining the positional relationship based on the comparison result.

17. The non-transitory computer-readable medium according to claim 16, wherein operations further comprise comparing a pixel which is included in the overlapped region of the detected object, and a pixel which is included in the overlapped region in the protective barrier region with each other, and determines the positional relationship based on a degree of similarity of the pixels in the overlapped region.

18. The non-transitory computer-readable medium according to claim 15, wherein operations further comprise:
    determining a positional relationship when the detected object and the registered region overlap with each other in the image, and the detected object and the protective barrier region overlap with each other in the image, and determining whether or not the detected object has intruded into the registered region based on the determination result, wherein
    the protective barrier region is a region of a protective barrier which is an object provided at a boundary of a registered region which is registered in the image, or in a vicinity of the boundary, and blocks the detected object.

19. The non-transitory computer-readable medium according to claim 15, wherein operations further comprise:
    detecting a moving object which is included in the image, and determining whether or not there is occlusion relating to the detected moving object.

20. The non-transitory computer-readable medium according to claim 19, wherein operations further comprise determining whether or not there is the occlusion based on a comparison result produced by comparing size information relating to the detected moving object to size information relating to a moving object which is detected immediately before the moving object in the image.

* * * * *